US006055602A

United States Patent [19]

McIlvain et al.

[11] Patent Number: 6,055,602

[45] Date of Patent: *Apr. 25, 2000

[54] LOGICAL POSITIONING WITHIN A STORAGE DEVICE BY A STORAGE CONTROLLER

[75] Inventors: James Elkins McIlvain, Los Gatos, Calif.; William Chambers Shepard, Hyde Park, N.Y.

[73] Assignee: International Business Machines Corporation, Armonk, N.Y.

[ * ] Notice: This patent is subject to a terminal disclaimer.

[21] Appl. No.: 09/089,811

[22] Filed: Jun. 3, 1998

Related U.S. Application Data

[63] Continuation of application No. 08/921,955, Aug. 26, 1997, Pat. No. 5,765,200, which is a continuation of application No. 08/480,730, Jun. 7, 1995, abandoned.

[51] Int. Cl.[7] .......... G06F 12/02

[52] U.S. Cl. .......... 711/112; 711/150; 711/168; 711/169; 711/170; 711/209; 395/500

[58] Field of Search .......... 711/170, 150, 711/168, 169, 112, 209, 147; 395/500; 710/24

[56] References Cited

U.S. PATENT DOCUMENTS

| | | | |
|---|---|---|---|
| 4,727,512 | 2/1988 | Birkner et al. | 364/900 |
| 4,736,341 | 4/1988 | Redmond et al. | 364/900 |
| 4,792,896 | 12/1988 | Maclean et al. | 364/200 |
| 4,949,301 | 8/1990 | Joshi et al. | 364/900 |
| 4,959,776 | 9/1990 | Deerfield et al. | 364/200 |
| 5,251,303 | 10/1993 | Fogg, Jr. et al. | 710/24 |
| 5,313,617 | 5/1994 | Nakano et al. | 395/500 |
| 5,317,739 | 5/1994 | Elko et al. | 395/650 |
| 5,448,702 | 9/1995 | Garcia, Jr. et al. | 710/24 |
| 5,488,694 | 1/1996 | McKee et al. | 710/4 |
| 7,765,200 | 6/1998 | McIlvain et al. | 711/170 |

*Primary Examiner*—Hiep T Nguyen
*Attorney, Agent, or Firm*—William A. Kinnaman, Jr.; Heslin & Rothenberg, P.C.

[57] ABSTRACT

A logical positioning mechanism is provided within a storage controller, thus enabling the storage controller to determine which logical position in a storage device is to be accessed next. The logical positioning mechanism includes one or more logical position indicators defined, maintained and controlled by the storage controller. The logical position indicators include the address of the logical position to be next accessed and are incremented and decremented by the storage controller depending upon the operation accessing the logical position.

29 Claims, 14 Drawing Sheets

TERMINATE PADS SESSION
(CONTINUED)

WRITE NEXT PROCESSING
PART 3: WRITE CKD
(CONTINUED)

READ NEXT PROCESSING
PART 3: READ DATA

READ NEXT PROCESSING
PART 3: READ DATA
(CONTINUED)

LOGICAL POSITIONING WITHIN A STORAGE DEVICE BY A STORAGE CONTROLLER

This application is a continuation of application Ser. No. 08/921,955, filed Aug. 26, 1997, now U.S. Pat. No. 5,765,200 which is a continuation of application Ser. No. 08/480,730, filed Jun. 7, 1995, abandoned.

TECHNICAL FIELD

This invention relates in general to processing within a computer system and, in particular, to providing a storage controller within the computer system with the capability of controlling logical positioning within a storage device during execution of input/output (I/O) commands.

BACKGROUND ART

Information is typically stored on external storage devices, such as direct access storage devices (DASD) or optical disks, for retrieval at a later time. Previously, in order to store the information on the storage device, a processor would issue an input/output (I/O) command which was passed to a storage controller specifying at what location on the storage device the information was to be stored. Similarly, if the information was to be read from the storage device, the processor would pass a read command to the storage controller specifying the address of the position to be read. Thus, it was the processor that kept track of the addresses and the particular positions to be written to or read from.

Processor control of the particular positions to be written to or read from offers certain disadvantages particularly in a multisystem environment. For instance, difficulties arise in a multisystem environment in which the multiple hosts wish to write log data to a single log data set. If the data set resides on DASD, it can be shared by the multiple host systems. But, because each host is separately responsible for determining the location of the next record to write on disk, there is no simple way for multiple hosts to coordinate their log writes to create a single, sequential stream of log data.

Further, if one host system is writing to a log data set and another host is concurrently reading it, the reading system can often read past the last record written. This condition must be repeatedly detected and recovered from by the reading host. Additionally, the read and write activity is unsynchronized, which can cause degraded performance. Yet further, there is currently no simple way of allowing multiple hosts to coordinate sequential reading or writing of data set records so that the data set can be processed in parallel.

In addition to the above, other problems arise when the host systems are responsible for controlling the logical positioning on a storage device. For example, database recovery performance is degraded when a linear search of the log data set is required to locate the point from which to start the recovery processing. Further, there is no inexpensive, but large capacity mechanism for supporting shared work queues.

Based on the foregoing, a need exists for a logical positioning mechanism which is not controlled by the host processors. A further need exists for a mechanism which enables the storage device to be viewed by host programs as a complex data structure. A yet further need exists for a logging mechanism which allows multiple hosts to write to a single log data set. A further need exists for the logical positioning mechanism to be usable by multiple host processors in an environment where the multiple host processors have shared access to the same storage device. A further need also exists to allow the data on the storage device to be accessed compatibly by existing host processors without using the mechanisms of the present invention. When the storage device is shared by multiple host processors, a requirement exists for allowing some of the host processors to access the storage device using the mechanisms of the present invention and others to access the storage device using existing mechanisms.

SUMMARY OF THE INVENTION

The shortcomings of the prior art are overcome and additional advantages are provided through the provision of a logical positioning mechanism located within a storage controller of a computer system. In one aspect of the present invention, at least one computer readable medium for storing data usable by a storage controller is provided. The at least one computer readable medium has a data structure stored therein. The data structure includes a logical position indicator and a session identifier corresponding thereto. The logical position indicator is usable by the storage controller in determining a logical position within a storage device to be accessed. The storage controller is coupled to the storage device in a computer system. The session identifier indicates a session of the computer system.

The logical positioning mechanism of the present invention shifts the logical positioning responsibility from the host processors to the storage controller. This advantageously enhances the capabilities of the storage controller and of the computer system. In particular, as one example, multiple hosts are capable of writing data to a single log data set, since it is the responsibility of the storage controller to determine the next location to write the data, for example, the next free block (or record). The host processors are relieved of this task.

Further, database recovery processing is improved since the storage controller can provide location information to the host that can be used for positioning when recovery is to be started. This eliminates the need for a linear search of a log data set. Additionally, since the storage controller is controlling the logical positioning, it is capable of preventing reading past the last written record.

Furthermore, by using logical position indicators, the storage device can emulate to the host programs complex data structures, such as queues, stacks or linked lists. For example, one logical position indicator can represent the head of a queue and another can designate the tail of the queue. As another example, input/output commands using the logical position indicators can emulate a stack such that a Write Next And Add operation acts as a "push" operation and a Read Previous And Delete operation acts as a "pop" operation. As a further example, a linked list can be emulated by saving the logical position of the next record in the list in an area in the current record. In one example, the logical position of the next record could be stored in the key field of the current record. Other similar commands can also be implemented using the logical position indicators, in accordance with the principles of the present invention.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

The present invention is directed to a logical positioning mechanism maintained and controlled by a storage controller of a computer system. As used herein, a logical position is defined as the location of the next record to be read or written on a storage device, as viewed by the host system. As one example, if the data on a storage device is addressed by the host system using block numbers, then the logical position is a block number. The logical positioning mechanism includes, for example, one or more logical positioning indicators (also referred to as pointers) stored within the storage controller for determining a "next" logical position within a storage device of the computer system to be accessed. A next logical position does not necessarily mean the next successive logical position, but can also mean a previous logical position or any other logical position. It is whatever logical position is to be accessed next, as determined by the type of command and other controls. The logical positioning mechanism of the present invention is described in detail below.

Figure 1:
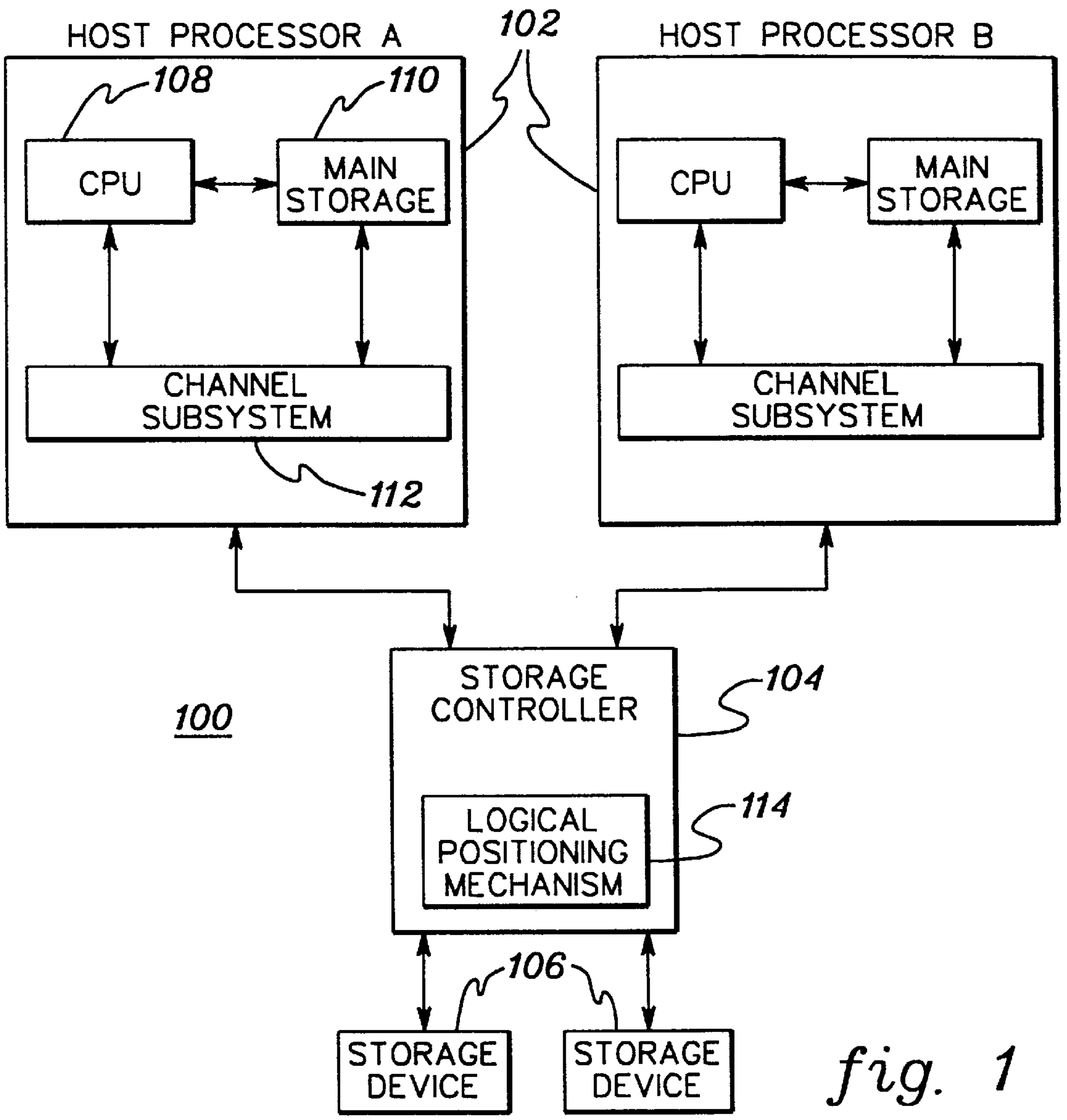
FIG. 1 depicts one example of a computer system including the logical positioning mechanism of the present invention.

FIG. 1 depicts one example of a computer system 100 incorporating the logical positioning mechanism of the present invention. In one example, computer system 100 is designed following the Enterprise Systems Architecture (ESA)/390 offered by International Business Machines Corporation.

Enterprise Systems Architecture/390 is described in detail in "Enterprise Systems Architecture/390 Principles of Operation," Publication Number SA22-7201-02, Third Edition (February 1995) offered by International Business Machines Corporation, which is hereby incorporated herein by reference in its entirety. Computer system 100 includes, for instance, a plurality of host processors 102, a storage controller 104, and one or more storage devices 106. Each of these components is described in detail below.

Each host processor 102 includes, for example, one or more central processing units 108, a main storage 110 and a channel subsystem 112. Central processing units 108 are the controlling center of computer system 100. Each central processing unit contains the sequencing and processing facilities for instruction execution, interruption action, timing functions, initial program loading, and other machine-related functions. Each central processing unit 108 is coupled to main storage 110 and channel subsystem 112.

Main storage 110 is also coupled to channel subsystem 112. Main storage 110 is directly addressable and provides for high-speed processing by the central processing units and the channel subsystem of data stored within the main storage.

Channel subsystem 112 is coupled to central processing unit 108 and main storage 110. Channel subsystem 112 directs the flow of information between storage devices 106 and main storage 110. It relieves the central processing units of the task of communicating directly with the storage devices and permits data processing to proceed concurrently with input/output processing.

Host processors 102 are coupled to storage controller 104. In particular, in one embodiment, the channel subsystems are coupled via one or more links to the storage controller. As one example, the storage controller is a 3990 Storage Control Unit offered by International Business Machines Corporation. (3990 Storage Control Units are described in detail in "IBM 3990 Storage Control Reference for Model 6, " Publication Number GA32-0274-02, Third Edition (March 1995), offered by International Business Machines Corporation, which is hereby incorporated herein by reference in its entirety.) The storage controller provides the logic to operate and control one or more of the storage devices and adapts, through the use of common facilities, the characteristics of each storage device to a link interface provided by the channel subsystem. The common facilities provide for the execution of input/output operations, indications concerning the status of the storage devices and storage controller, and control of the timing of data transfer between the channel subsystem and the storage controller. Additionally, in accordance with the principles of the present invention, the storage controller includes a logical positioning mechanism 114 used to determine a storage device logical position to be accessed by the processors during input/output operations and other operations.

The storage controller is attached via a bus to one or more storage devices 106. Storage devices 106 receive information from or store information in main storage 110. Examples of storage devices 106 include magnetic-tape units, direct-access storage devices (DASD), optical disks, printers, teleprocessing devices, communication controllers and sensor-based equipment, including optical devices.

The computer system described above is only one example. It will be apparent to those of ordinary skill in the art that various embodiments may exist. For example, more than two host processors may be attached to the storage controller; each host processor may have a plurality of central processing units; additional storage may be provided within each host processor; and/or more than one storage controller may be used. Further, in another embodiment, the storage controller and storage devices may be physically integrated. Yet further, the system may be a single system including one or more central processing units. Additionally, it is not necessary for the computer system to be based on the Enterprise Systems Architecture/390. The techniques of the present invention work equally as well with different architectures. As an example, it is possible to use the present invention with architectures that do not support channel subsystems. Further, the present invention can be used with file servers, workstations and personal computers, as examples. In the case of a personal computer, the storage controller may simply be a storage card having, for instance, a Small Computer System Interface (SCSI). The techniques of the present invention are applicable to any computer system using information stored on a storage device.

The logical positioning technique of the present invention is discussed in relation to a particular storage device, i.e., DASD; however, it will be apparent to one of ordinary skill in the art that the invention is also applicable to other storage devices, such as, for example, optical devices.

Figure 2:
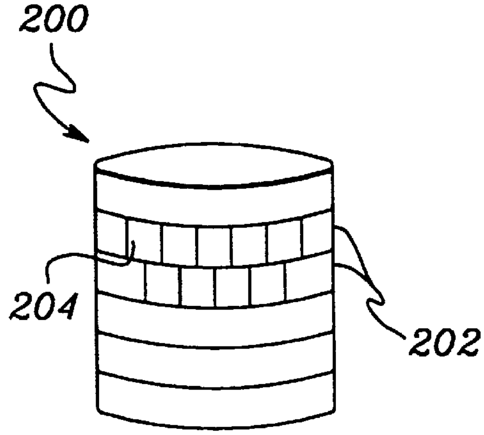
FIG. 2 illustrates one example of a storage device including a plurality of logical positions capable of being accessed by the logical positioning mechanism of the present invention.

One example of a storage device 200 is depicted in FIG. 2. Storage device 200 includes, for instance, a plurality of data sets 202, each data set including a plurality of logical positions 204. Each logical position is addressable and is capable of having data stored-therein or data read therefrom using an appropriate input/output command. In one example, a logical position can represent a block or a record on the storage device and can be addressed in a number of ways. For example, when the storage device is a Count Key Data (CKD) direct access storage device, the logical positions are addressable by indicating the cylinder (CC), head (HH) and record (R) numbers (CCHHR). However, other DASD and other storage devices are addressable in other ways. For example, it is possible to address a storage device using fixed block addressing or sector addressing.

In one example, a data set can have one or more extents, and each extent includes one or more locations that can receive data. Additionally, one or more extents are associated with a host program through a session identifier. A session can represent one data set, multiple data sets or one part of a data set. One or more hosts can be registered with a session.

As mentioned above, information is stored on or read from storage devices using input/output operations, such as read or write commands. In particular in the ESA/390 architecture, a host processor begins execution of a channel program, which includes one or more channel command words specifying the particular operations to be performed. Execution of the input/output operations is accomplished by the decoding and executing of one or more channel command words by the channel subsystem and the storage controller.

Previously, the host processors would specifically indicate the address of the logical or physical position on the storage device to be accessed, i.e., to write data to or read data from. For example, if the processor were issuing a command to write data to a DASD data set, the processor would indicate the particular CCHHR for writing the data. In accordance with the principles of the present invention, the host processor is relieved of this task. Specifically, the processor does not have to specify to the storage controller the logical position at which the data is be written to or read from. As described below, in accordance with the principles of the present invention, the processor merely tells the storage controller to write the data and the storage controller uses the logical positioning mechanism stored therein to determine the next logical position to receive the data. The use of the logical positioning mechanism by a processor does not preclude processors from using other commands not having the logical positioning mechanism to access the data. For example, typical read or write commands can be used.

In one embodiment, the logical positioning mechanism of the present invention includes one or more logical positioning indicators (LPI) stored within the storage controller for indicating the next logical position within the storage device to be accessed. In one particular example, two logical position indicators, a write logical position indicator and a read logical position indicator, are used for each session established by host processors.

Figure 3:
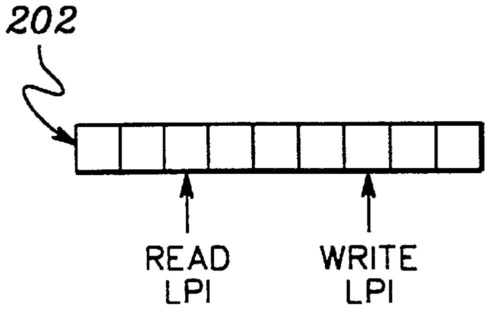
FIG. 3 illustrates a conceptual view of one example of using two logical position indicators, in accordance with the principles of the present invention.

One schematic diagram illustrating the use of the logical position indicators is depicted in FIG. 3. As is shown, a read logical position indicator points to one location of data set 202 and a write logical position indicator points to another location. In this example, the read logical position indicator specifies that this is the next logical position to be read when an appropriate read command is issued, and the write logical position indicator specifies that this is the next logical position to be written to when an appropriate write command is received, as described below.

The use of two logical position indicators is only one example. It is possible to use only one logical position indicator or to use more than two indicators. Also, in the above example, it is shown that the read and write indicators are pointing to different logical positions. This is just one example. As another example, the indicators could point to the same logical position. Other variations are also possible and are considered within the scope of the claimed invention.

Figure 4:
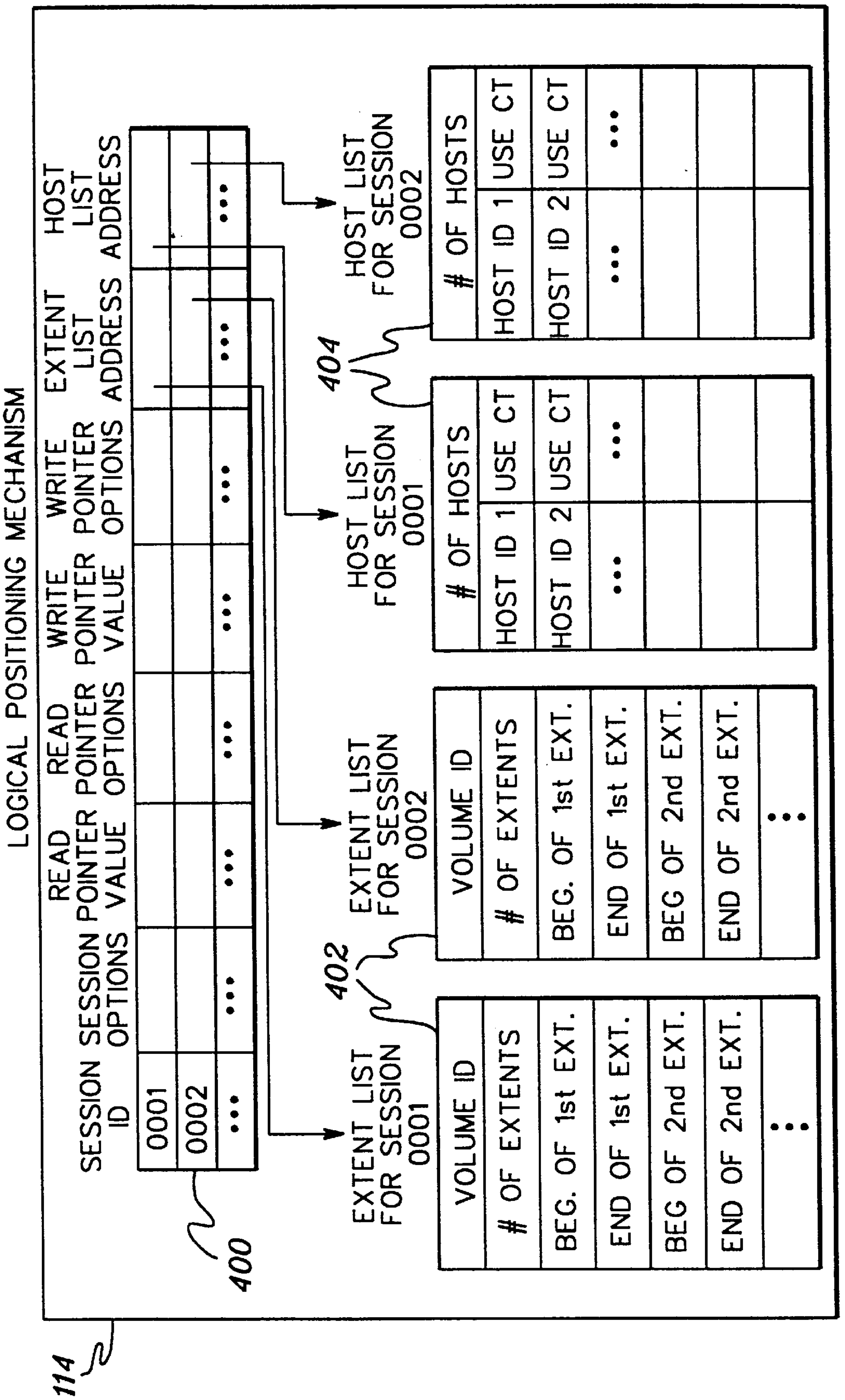
FIG. 4 depicts one example of a global array storing the logical position indicators of the present invention.

In one embodiment, the logical position indicators are stored within a global array 400 (FIG. 4) within the memory of storage controller 104. In particular, logical positioning mechanism 114 of storage controller 104 includes global array 400. As depicted in FIG. 4, global array 400 includes, in one embodiment, a session identifier specifying the session established by a host processor; one or more session options, which may include, for instance, an indication to notify all the hosts registered with a session that a particular event occurred; a read pointer value for the session, which in one instance, for DASD, is a CCHHR number; options for the read pointer, such as whether the pointer is operating in wraparound mode; a write pointer value, such as a CCHHR value and its options; an extent list address indicating the address of an extent list 402 for that session; and a host list address, specifying the address of a host list 404 indicating the hosts registered with a particular session.

In one example, each extent list 402 includes a volume id indicating the volume containing the extents for that session; an indication of the number of extents associated with the session identifier and an indication of the beginning and ending of each extent in the list. In another example, the structure of the extent list could be modified to include extents on multiple volumes. This would allow a PADS session to be used with a multi-volume data set. In addition to the above, in one instance, each host list 404 includes an indication of the number of hosts registered with the session, and the host id and a use count for each registered host. The host id may include, for instance, a Path Group ID. The use count represents a count of the number of users for the host using that session. In one example, the use count is incremented when a valid PSF establish PAD session command, described below, is received.

In an alternative implementation, the host software may coordinate the use of the same session by multiple users on the same host. The host software could ensure that a single PSF establish and a single PSF terminate command is done for the host, and maintain a use count in host software to aid in determining when to issue the PSF establish and terminate commands. The control unit then would have a host list per session in the global array, but would not maintain the use count per host.

The above-described global array is only one example. Additional information may also be stored in the array or some of the information described above may be eliminated. For instance, it is possible to have multiple read and/or write pointers, each having its own id and associated controls. Further, an array structure is not the only means for storing the information.

In order to use the logical positioning mechanism of the present invention, and in particular, the logical positioning indicators stored in the global array, additional input/output operations or extensions to existing commands have been developed, in accordance with the principles of the present invention. These operations or extensions include, for instance, a WRITE NEXT operation, a READ NEXT operation, a WRITE PREVIOUS operation, a READ PREVIOUS operation, a WRITE NEXT AND ADD operation, a READ PREVIOUS AND DELETE operation, a READ POINTER operation and a SET POINTER operation, each of which is described in detail below. These operations are only illustrative of the operations that can be used. Other commands, functions, or operations may also be used as will be apparent to those of ordinary skill in the art.

A WRITE NEXT operation is used for forward processing. When storage controller 104 receives a WRITE NEXT operation from host processor 102, the storage controller uses the logical position indicators, and in particular, the write logical position indicator to determine where the data is to be written on storage device 106. After the data is written, the write logical position indicator is incremented. In the situation in which the storage device is DASD, the write logical position indicator may have a CCHHR value. The CCHHR pointer value is incremented across track and cylinder boundaries within the session for which it is defined.

Similarly, the READ NEXT operation is used for forward processing, and when it is received by the storage controller, the storage controller uses, for example, a read logical position indicator to determine which logical position on the storage device is to be read. When the data at that logical position is read, the read logical position indicator is incremented.

The WRITE PREVIOUS and READ PREVIOUS operations are used for backward processing. These operations are similar to the WRITE NEXT and READ NEXT operations however, the pointers are decremented to point to the previous logical position after the write or read operation is completed.

The WRITE NEXT AND ADD operation and the READ PREVIOUS AND DELETE operation are used, for example, for stack implementation. The WRITE NEXT AND ADD operation is similar to the WRITE NEXT command, but causes both the read and write pointers to be incremented, so the read pointer addresses the record just written and is one less than the write pointer. The READ PREVIOUS AND DELETE operation causes the position pointed to by the read logical position indicator to be read and then, both the read and write indicators are decremented to point to their previous positions. The write pointer is one position ahead of the read pointer.

The READ POINTER and SET POINTER operations are designed for specialized usage. These operations are similar to a known Perform Subsystem Function (PSF) used to establish a session, as described below. However, these operations require that the session already be initialized, and merely read or set one or more of the pointer values. In the context of a DASD data set, these operations pass as parameters the session identifier (id) and one or more logical pointer types (e.g., read or write), and pass or receive one or more pointer values. The SET POINTER can be used to save the location of where recovery is to be started, as one example.

Described in detail above is a storage controller enhancement, which enables the storage controller to control logical positioning within a storage device. One example of the logic associated with setting up the storage controller to use the logical positioning indicators of the present invention is described below with reference to FIG. 5.

Figure 5:
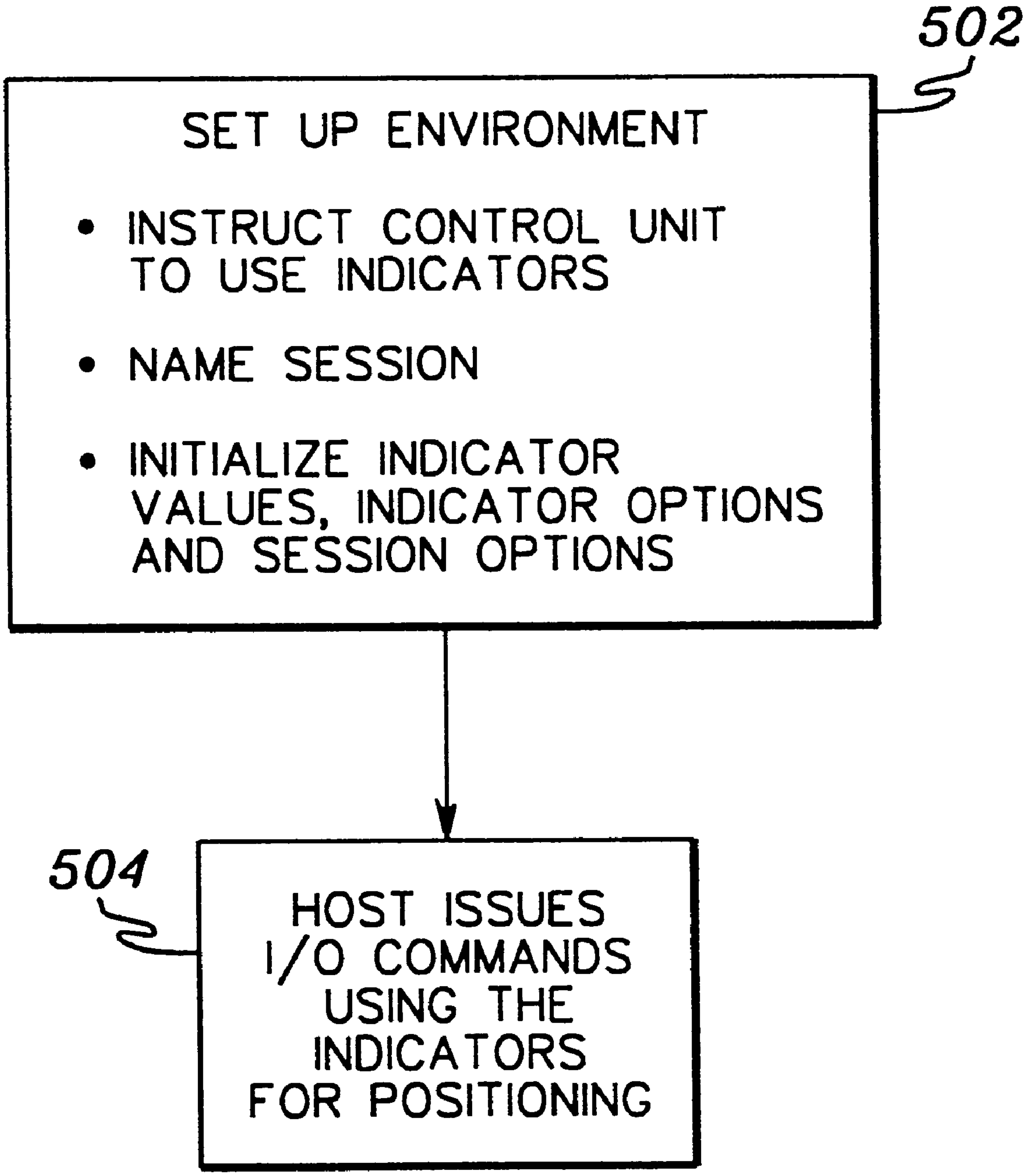
FIG. 5 depicts one embodiment of the logic associated with using the logical positioning mechanism of the present invention.

Referring to FIG. 5, in order for the storage controller to control logical positioning and maintain logical position indicators, the storage controller environment needs to be set up, STEP 502. In particular, the storage controller is instructed to use logical position indicators; a session, which identifies to a particular user (e.g., an application program) the extents associated with the logical position indicators and the type of addressing, is named; and the indicator values, indicator options, and session options are initialized. In one example, a function referred to as Perform Subsystem Function (PSF) is used in order to set up the environment. One example of the Perform Subsystem Function is described in "IBM 3990 Storage Control Reference for Model 6, " Publication Number GA32-0274-02, Third Edition (March 1995), offered by International Business Machines Corporation, which is hereby incorporated herein by reference in its entirety.

The Perform Subsystem Function indicates to the storage controller what function is to be performed. In one example, the function to be performed is setting up the appropriate logical position indicator. Thus, it is the Perform Subsystem Function which informs the storage controller to use logical position indicators, specifies which logical position indicators are appropriate, initializes the logical position indicators and the logical position indicator options, names the session and initializes the session options. In particular, many of the above tasks are performed using parameters passed from the host to the storage controller. In one example, these parameters include a session identifier naming the session; the number of extents for the session; and the beginning and ending of each of the extents. In addition to the above, the logical position indicator(s) is (are) initialized. In one example, the appropriate logical position indicator is initialized to the beginning of the first extent. However, in another example, it is possible to initialize the indicator to a value passed from the host processor via the Perform Subsystem Function parameters.

Subsequent to setting up the environment, the logical position indicators may be used. In particular, the host issues I/O commands that instruct the storage controller to use the logical position indicators, STEP 504. For example, if a WRITE NEXT command is processed, then the storage controller will know that subsequent commands passed from the host are to be interpreted using the logical position indicators of the present invention. Similarly, if READ NEXT or any of the other operations described-above are passed from the host, then the storage controller knows to use the logical positioning indicators of the present invention. Further details associated with the definition and use of the logical positioning mechanism of the present invention are described in detail herein with reference to the below described examples.

In particular, a number of examples illustrating how the logical positioning mechanism of the storage controller is used are depicted and described below.

Each example includes, for instance the following fields:

(a) A sequence field: The sequence field indicates the processing order of the operations to be performed. In one example, each sequence represents a channel program being issued by a host processor and executed by the storage controller. Each channel program includes one or more channel command words (CCWs), each of which defines the command to be executed by the storage controller. As one example, if the sequence field contains a “1”, then this is the first sequence to be performed.

(b) A system field: The system field indicates which host processor is issuing the channel program. For example, if the system field includes a “1”, then host processor 1 is performing the operation.

(c) An operation field: The operation field identifies the operation to be performed by the storage controller, as instructed by the host processor.

(d) A description field: The description field explains the commands used to perform the operation specified in the operation field. Each of the commands is specified in bold face and the parameters for the commands are listed below the command. Each of the commands is described in greater detail after the examples.

(e) A write pointer field: The write pointer field contains the address of the write logical positioning indicator after the operation specified in the operation field is performed.

(f) A read pointer field: The read pointer field contains the address of the read logical positioning indicator after the operation specified in the operation field is performed.

The first example listed below illustrates a single system writing a number of records to a DASD log data set. Since no read operations are being performed, the read indicator (which would not be used) is specified as null. The write pointer includes, for example, a CCHHR address. The example illustrates writing half track records to a data set, starting at cylinder 20, head 0.

TABLE 1

Sequence of Events

| Sequence | System | Operation | Description | Write Pointer | Read Pointer |
|---|---|---|---|---|---|
| 1 | 1 | Establish PADS Session | PSF command issued to subsystem to register the Pointer Addressable Data Set (PADS) session and establish the extents of the data set to be processed.<br>Define Extent<br>Beginning of First Extent<br>End of First Extent<br>Flags and other parameters<br>Perform Subsystem Function<br>Operation Code: Establish PADS Session<br>Flags and other parameters<br>PADS Session ID<br>Number of Extents<br>Beginning of First Extent | 0020<br>0000<br>01 | Null |

TABLE 1-continued

Sequence of Events

| Sequence | System | Operation | Description | Write Pointer | Read Pointer |
|---|---|---|---|---|---|
| | | | End of First Extent<br>Beginning of Second Extent<br>End of Second Extent, Etc. | | |
| 2 | 1 | Write Next 5 Records | Define Extent<br>PADS Session ID<br>Beginning of First Extent<br>End of First Extent<br>Flags and other parameters<br>Locate Record Extended<br>Operation Code: Write Next<br>Count (of following Write CKD CCWs)<br>Flags and other parameters<br>Write CKD<br>Count (=0), Key (Optional), and Data Fields<br>Write CKD<br>Write CKD<br>Write CKD<br>Write CKD | 0020<br>0002<br>02 | Null |
| 3 | 1 | Write Next 3 Records | Define Extent<br>(PADS Session ID)<br>Locate Record Extended<br>(Write Next)<br>Write CKD<br>Write CKD<br>Write CKD | 0020<br>0004<br>01 | Null |
| 4 | 1 | Write Next 5 Records | Define Extent<br>(PADS Session ID)<br>Locate Record Extended<br>(Write Next)<br>Write CKD<br>Write CKD<br>Write CKD<br>Write CKD<br>Write CKD | 0020<br>0006<br>02 | Null |
| 5 | 1 | Write Next 4 Records | Define Extent<br>(PADS Session ID)<br>Locate Record Extended<br>(Write Next)<br>Write CKD<br>Write CKD<br>Write CKD<br>Write CKD | 0020<br>0008<br>02 | Null |
| 6 | 1 | Write Next 4 Records | Define Extent<br>(PADS Session ID)<br>Locate Record Extended<br>(Write Next)<br>Write CKD<br>Write CKD<br>Write CKD<br>Write CKD | 0020<br>000A<br>02 | Null |
| 7 | 1 | Write Next 5 Records | Define Extent<br>(PADS Session ID)<br>Locate Record Extended<br>(Write Next)<br>Write CKD<br>Write CKD<br>Write CKD<br>Write CKD<br>Write CKD | 0020<br>000D<br>01 | Null |
| 8 | 1 | Write Next 4 Records | Define Extent<br>(PADS Session ID)<br>Locate Record Extended<br>(Write Next)<br>Write CKD | 0021<br>0000<br>01 | Null |

TABLE 1-continued

Sequence of Events

| Sequence | System | Operation | Description | Write Pointer | Read Pointer |
|---|---|---|---|---|---|
| | | | Write CKD | | |
| | | | Write CKD | | |
| | | | Write CKD | | |
| 9 | 1 | Write Next | Define Extent | 0021 | Null |
| | | 5 Records | (PADS Session ID) | 0002 | |
| | | | Locate Record Extended | 02 | |
| | | | (Write Next) | | |
| | | | Write CKD | | |
| | | | Write CKD | | |
| | | | Write CKD | | |
| | | | Write CKD | | |
| | | | Write CKD | | |
| 10 | 1 | Write Next | Define Extent | 0021 | Null |
| | | 5 Records | (PADS Session ID) | 0005 | |
| | | | Locate Record Extended | 01 | |
| | | | (Write Next) | | |
| | | | Write CKD | | |
| | | | Write CKD | | |
| | | | Write CKD | | |
| | | | Write CKD | | |
| | | | Write CKD | | |
| 11 | 1 | Write Next | Define Extent | 0021 | Null |
| | | 5 Records | (PADS Session ID) | 0007 | |
| | | | Locate Record Extended | 02 | |
| | | | (Write Next) | | |
| | | | Write CKD | | |
| | | | Write CKD | | |
| | | | Write CKD | | |
| | | | Write CKD | | |
| | | | Write CKD | | |
| 12 | 1 | Write Next | Define Extent | 0021 | Null |
| | | 3 Records | (PADS Session ID) | 0009 | |
| | | | Locate Record Extended | 01 | |
| | | | (Write Next) | | |
| | | | Write CKD | | |
| | | | Write CKD | | |
| | | | Write CKD | | |
| 13 | 1 | Write Next | Define Extent | 0021 | Null |
| | | 4 Records | (PADS Session ID) | 000B | |
| | | | Locate Record Extended | 01 | |
| | | | (Write Next) | | |
| | | | Write CKD | | |
| | | | Write CKD | | |
| | | | Write CKD | | |
| | | | Write CKD | | |

As shown in the example above, host processor 1 establishes a Pointer Addressable Data Set (PADS) session, defines the extents and then performs WRITE NEXT processing via the Perform Subsystem Function. Each of these commands is described in further detail below with reference to FIGS. 6–7C.

Figure 6:
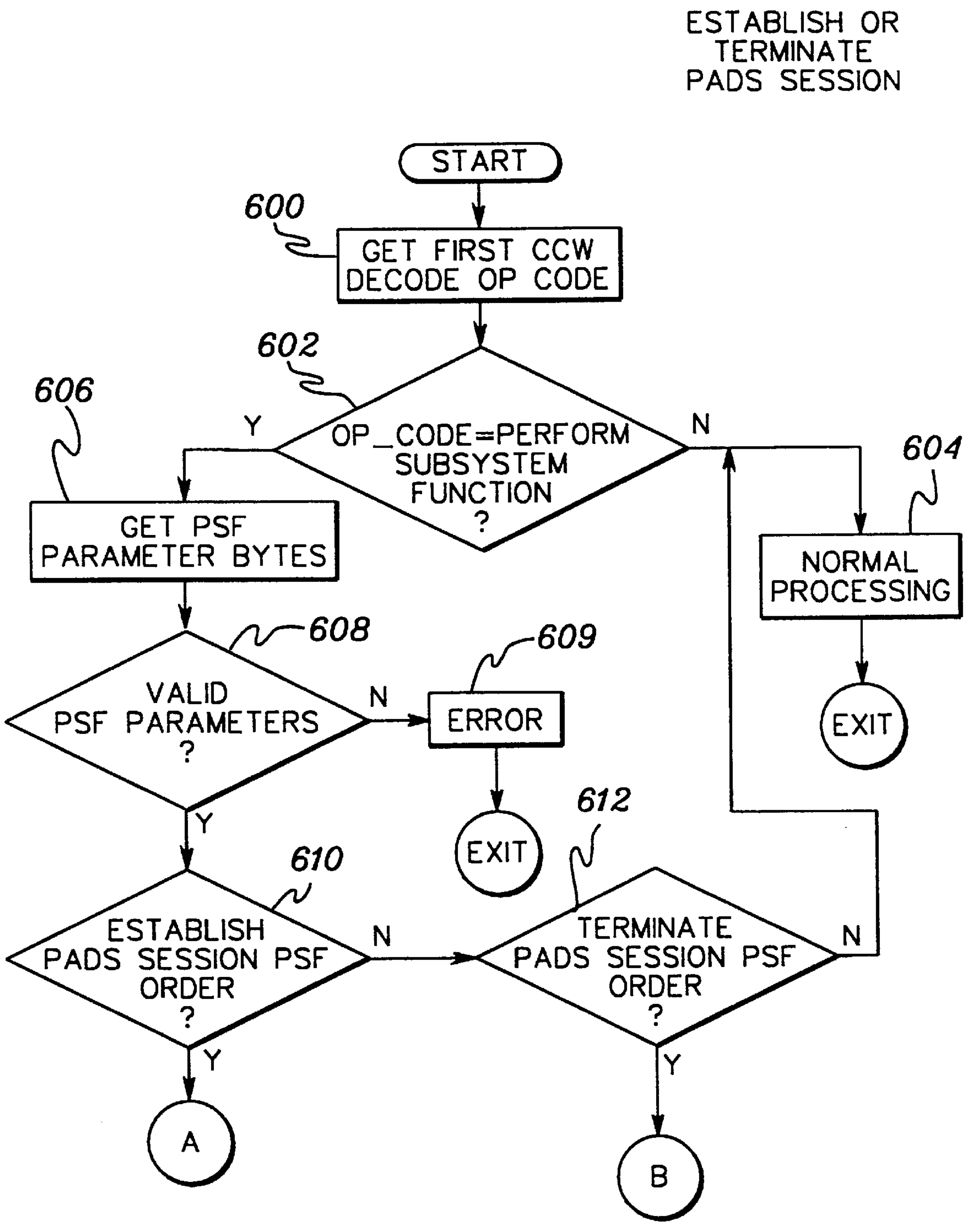
FIGS. 6–6B depict one example of the logic used to establish or terminate a session, in accordance with the principles of the present invention.

Initially, a program within host processor 1, in this example, issues a command, such as a Perform Subsystem Function (PSF) command to establish a PADS session. One example of the logic associated with establishing (or terminating) a PADS session is described below with reference to FIGS. 6–6B. Referring to FIG. 6, initially, a first channel command word is obtained by the storage controller from a host processor, such as host processor 1. The channel command word is decoded in order to determine the function specified by the operation code, STEP 600 "GET FIRST CCW; DECODE OP CODE." If the operation code is not a Perform Subsystem Function, INQUIRY 602, then processing proceeds as it would during normal processing, STEP 604 "NORMAL PROCESSING." However, if the operation code specifies a Perform Subsystem Function, then the parameter bytes of the function are obtained, STEP 606 "GET PSF PARAMETER BYTES." Next, a determination is made as to whether the PSF parameters are valid, INQUIRY 608 "VALID PSF PARAMETERS?" This determination is performed in a known fashion. If the parameters are invalid, then an error is flagged, STEP 609 "ERROR," and processing to establish the PADS session is ended. However, if the parameters are valid, then a further inquiry is made to determine if the operation specified by the PSF parameters is to establish the PADS session, INQUIRY 610, "ESTABLISH PADS SESSION PSF ORDER?" If the parameters do not specify that a PADS session is being established, then a further determination is made as to whether a PADS session is being terminated, INQUIRY 612. If the PADS session is neither being established nor terminated, then processing proceeds for other PSF orders, STEP 604 "NORMAL PROCESSING."

Figure 6A:
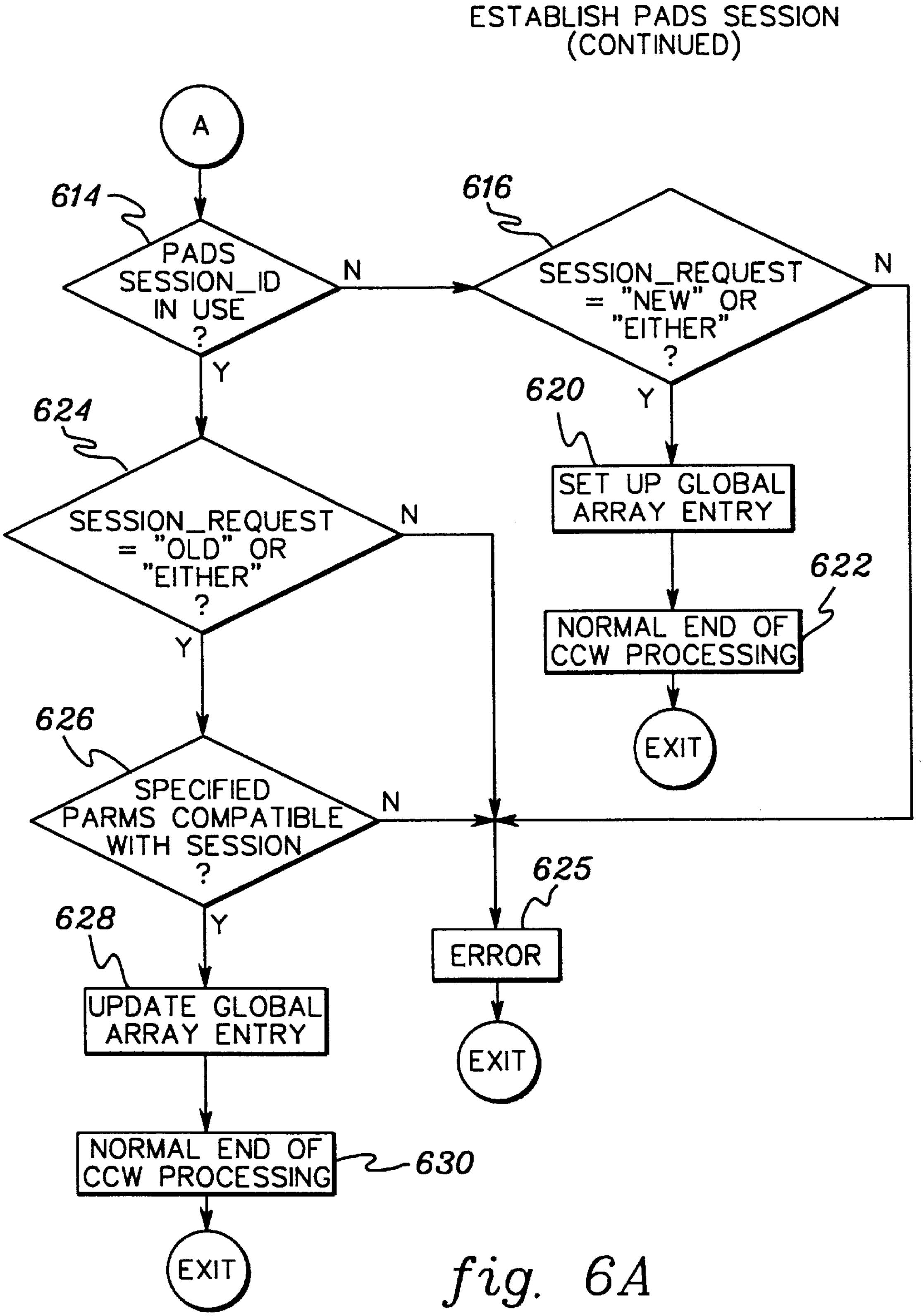

Returning to INQUIRY 610 "ESTABLISH PADS SESSION PSF ORDER?", if a PADS session is being established, then an inquiry is made as to whether the PADS session id is already in use, INQUIRY 614 "PADS SESSION_ID IN USE?" (FIG. 6A). If the session id is in use, then a further determination is made as to whether the session id can be used again, INQUIRY 624 "SESSION REQUEST="OLD" OR "EITHER"?". In particular, a request for the session may include an indication of whether the session can be OLD, NEW or EITHER. If the request specifies OLD or EITHER, then the same session id may be used, again. However, if it indicates NEW, then a new session id must be established. In this instance, if the session request is not OLD or EITHER, then an error is flagged, since the id is already in use, STEP 625 "ERROR." However, if the request is OLD or EITHER, then processing may continue.

In particular, a determination is made as to whether the parameters specified with the PSF are compatible with the session, INQUIRY 626. If not, an error is flagged, STEP 625 "ERROR." If, however, the session id is in use, the request is OLD or EITHER, and the parameters are compatible, then global array 400 is updated, STEP 628 "UPDATE GLOBAL ARRAY." Specifically, the use count for this host, e.g., host 1 in this example, is incremented by one. Then, processing of the CCW completes as normal, STEP 630 "NORMAL END OF CCW PROCESSING."

Returning to INQUIRY 614 "PADS SESSION_ID IN USE?", if the session id is not in use and the request is neither NEW nor EITHER, INQUIRY 616, then an error is flagged, STEP 625. However, if the request is NEW or EITHER, INQUIRY 616, then an entry in global array 400 is created, STEP 620 "SET UP GLOBAL ARRAY ENTRY." In particular, inserted in the global array entry is a session id, the session options, the pointer options, and the extent list, which are received from the PSF parameters. In addition, the host id is filled in and the read and write pointers are initialized to the beginning of the extent. Thereafter, processing of the channel command word is complete, STEP 622 "NORMAL END OF CCW PROCESSING."

Figure 6B:
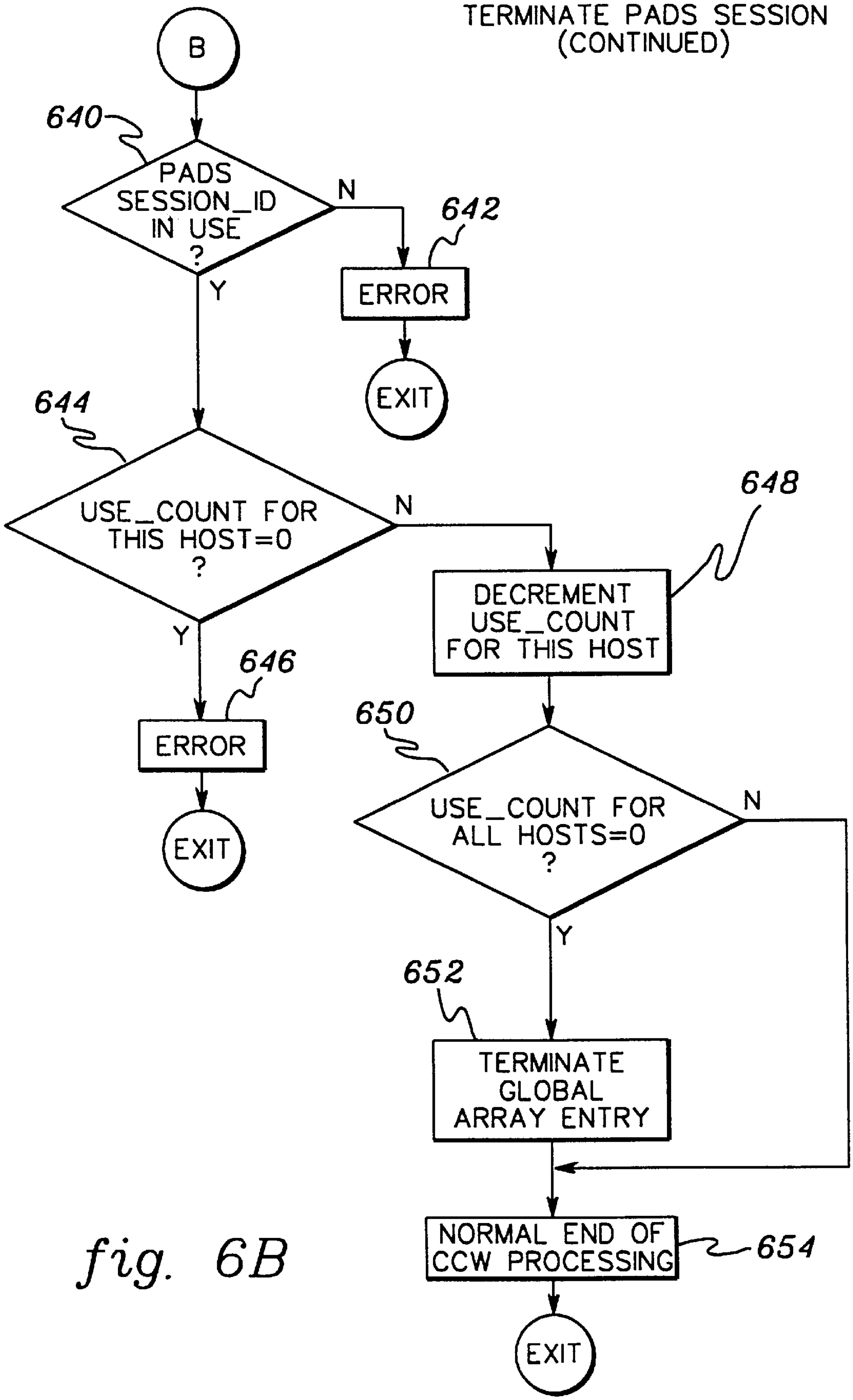

Returning to INQUIRY 612, "TERMINATE PADS SESSION PSF ORDER?", if this is a request to terminate the PADS session, then a further determination is made as to whether the PADS session id is in use, INQUIRY 640 (FIG. 6B). If the PADS session id is not in use and therefore, cannot be terminated, an error is flagged, STEP 642 "ERROR." However, if the PADS session id is in use, then the use_count for the particular host, e.g., host 1, is checked to see if it is equal to zero, INQUIRY 644 "USE_COUNT FOR THIS HOST=0?". If it is equal to zero, then an error is flagged, since there is nothing to terminate, STEP 646

"ERROR." If however, the use_count is not equal to zero, then it is decremented, STEP 648. "DECREMENT USE_ COUNT FOR THIS HOST," and a further determination is made as to whether the use count for all hosts is equal to zero, INQUIRY 650. If one of the hosts registered with a session has a use count greater than zero, then normal processing continues, STEP 654. If on the other hand, the use count is equal to zero for all hosts, then the global array entry is terminated, STEP 652 "TERMINATE GLOBAL ARRAY ENTRY." In particular, all of the fields in the entry row for the session id are set to zero and the entry row for the session id is deallocated. Thereafter, the channel command word is ended normally with a channel end and device end, STEP 654 "NORMAL END OF CCW PROCESSING."

As stated above and shown in the example, after the environment is set up, then the host may issue I/O commands using the logical position indicators for positioning. In one example, the logical position indicators are used in WRITE NEXT processing. One example of WRITE NEXT processing is depicted in FIGS. 7–7C and described in detail below.

Initially, an extent is defined and then WRITE NEXT processing may proceed. Specifically, referring to FIG. 7, initially a Define Extent command is processed. In environments that support the ECKD architecture, the Define Extent (DX) command is usually the first command in a channel program. The Define Extent command defines, for example, the extent that the channel program will operate in. The limits of the extent are defined by specifying the addresses of the first and last tracks in the extent. The Define Extent command also defines attributes of and limitations on the commands that follow in the channel program, as well as the usage and control attributes for cache for the remaining channel program. The Define Extent command is embedded within a channel command word, which is built by the system control program. The DX command permits the system control program to prevent one user (e.g., an application program) from accessing data of another application without authorization. In particular, the Define Extent command is used to determine if the channel program is allowed to write to a particular volume, and what track range (extent) it can access. Since these checks are to ensure data integrity and security, they supersede the extents in which the logical pointers of the present invention operate. In practice, the range specified in the Define Extent parameters can be one of the extents in which the indicators operate, or a subset of an extent that does not limit the functioning of the channel program.

In the case of a data set with multiple extents, the parameters of the DX command specify an extent that does not contain any logical positions (or tracks, in one example) that are not allocated to the data set being accessed, since such logical positions may be assigned to another data set and contain data for another user. Therefore, in the case of a multiple extent data set, an error condition arises when the channel program attempts to access data that is beyond the extent specified in the DX parameters. Such an attempt results in an extent violation or protection exception, as reported in the sense bytes presented after the unit check. In one embodiment, the protection mechanism of the DX command is used with the functions of the present invention, such that logical positions accessed with the commands of the present invention are contained within the extent specified in the Define Extent command.

Figure 7:
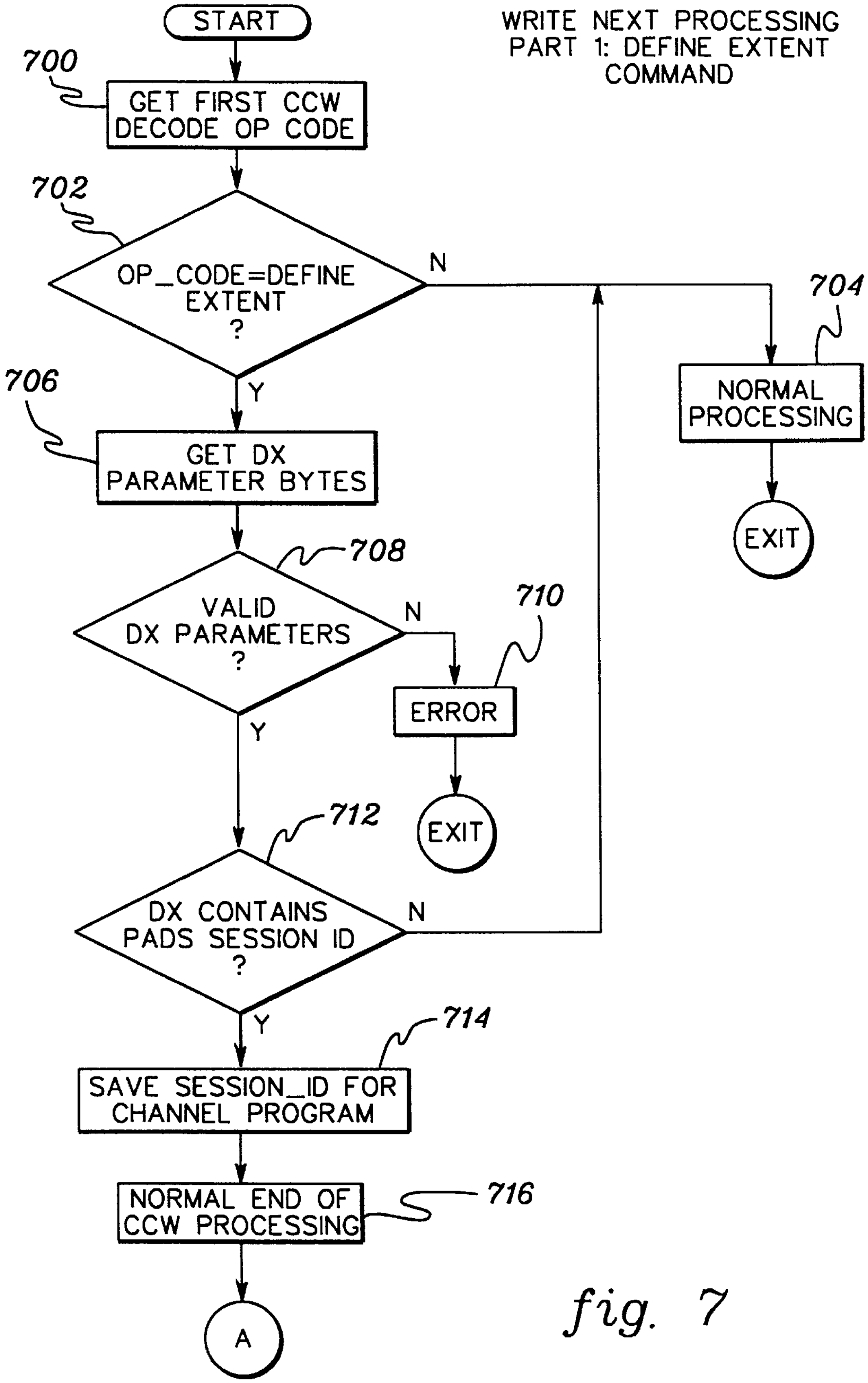
FIGS. 7–7C depict one example of the logic used to write data to a storage device using the logical pointers of the present invention.

In order to process the DX command, initially, a CCW is received from the host processor, e.g. processor 1 in this example, and the op code is decoded by the storage controller, STEP 700 "GET FIRST CCW, DECODE OP CODE" (FIG. 7). If the decoded op code does not represent a Define Extent (DX) command, INQUIRY 702, then processing proceeds in a standard fashion, STEP 704 "NORMAL PROCESSING." However, if the operation to be performed is a Define Extent operation, then the Define Extent parameter bytes are obtained, STEP 706 "GET DX PARAMETER BYTES." Next, a determination is made as to whether the parameters are valid, INQUIRY 708. If the parameters are invalid, then an error is flagged, STEP 710 "ERROR." However, if the parameters are valid, then a further determination is made as to whether the Define Extent command contains a PADS session ID, INQUIRY 712 "DX CONTAINS PADS SESSION ID?" If the Define Extent command does not contain a PADS session ID, then normal processing continues for the Define Extent command, STEP 704 "NORMAL PROCESSING." However, if a PADS session ID is contained within the Define Extent operation, then the session ID and other DX parameters are saved for use by the channel program, STEP 714 "SAVE SESSION_ID FOR CHANNEL PROGRAM." Thereafter, channel command word processing is terminated for the Define Extent command, STEP 716 "NORMAL END OF CCW PROCESSING."

After the Define Extent command is processed, WRITE NEXT processing continues by executing a Locate Record Extended (LRE) command. A Locate Record or Locate Record Extended command specifies, for instance, the input/output operations to be performed, including the number of consecutive logical positions (e.g., records) to be affected by the operations, and the address of the first position to be accessed, as well as the orientation (logical position on the addressable storage device) at which subsequent channel program operations begin. Additionally, the Locate Record command defines the bounds and attributes of an operational domain. This domain begins with the transfer of the Locate Record parameters and extends through the last operation specified in the Locate Record parameter In order to use the Locate Record Extended command in accordance with the principles of the present invention, the orientation parameters of the command which specify at which logical position the data transfer operations begin are zeros or some other value indicating that the storage controller is maintaining the logical position information and that the storage controller will indicate which logical position is to be accessed.

Any new functions to be implemented in accordance with the principles of the present invention are assigned a new Locate Record Extended operation code.

Figure 7A:
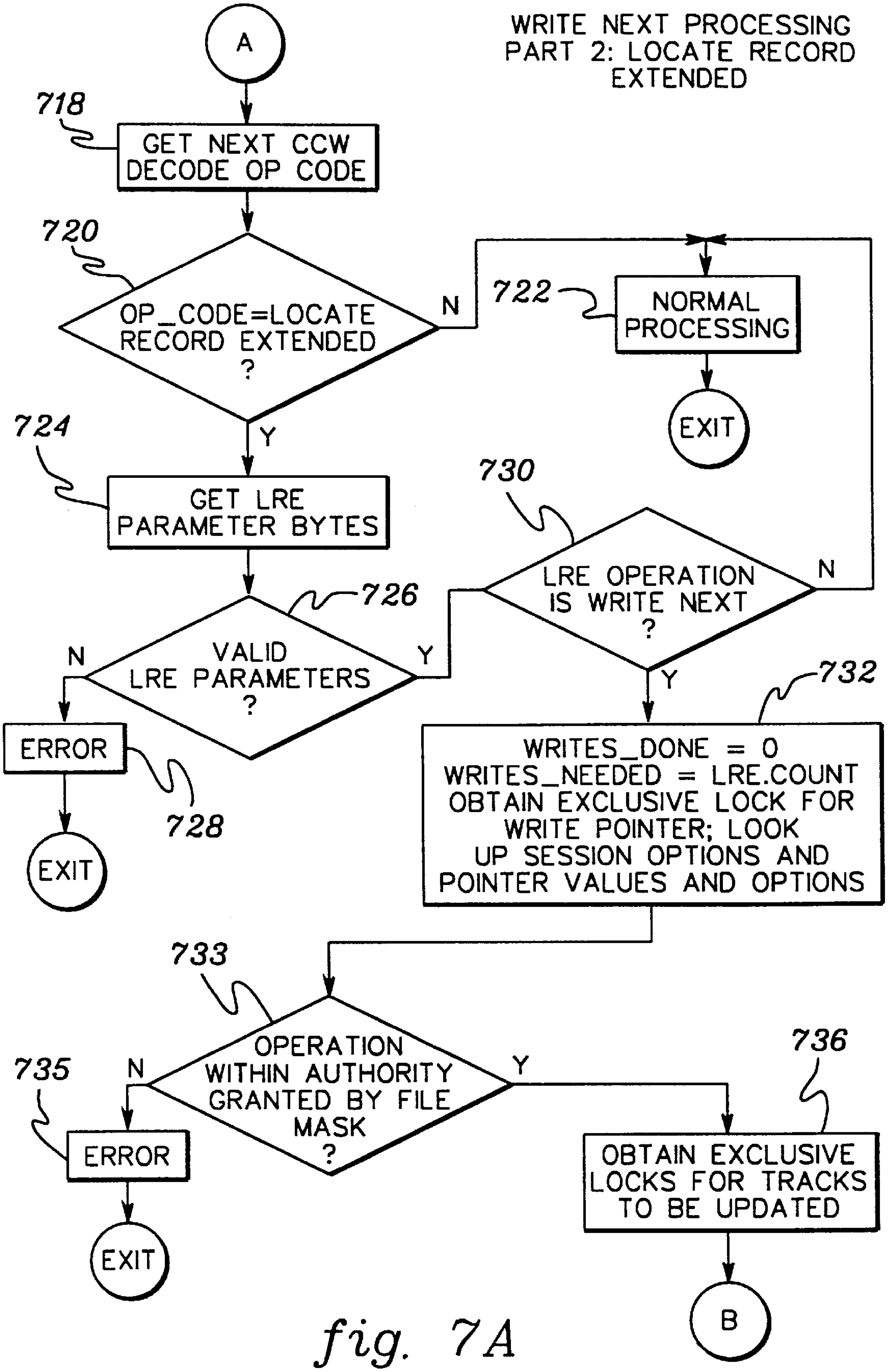

Referring to FIG. 7A, in processing a Locate Record Extended command, initially, the next CCW is obtained and the op code is decoded, STEP 718 "GET NEXT CCW; DECODE OP CODE." A determination is made as to whether the op code represents the Locate Record Extended command, INQUIRY 720. If it does not, then processing continues as if a Locate Record Extended command was not issued, STEP 722 "NORMAL PROCESSING." However, if a Locate Record Extended command is issued, then the parameter bytes for that command are obtained, STEP 724 "GET LRE PARAMETER BYTES." Next, a determination is made as to whether the parameters are valid, INQUIRY 726 "VALID LRE PARAMETERS?" If the parameters are invalid, then an error is flagged, STEP 728 "ERROR." However, if the parameters are valid, then a further determination is made as to whether the operation to be performed is a WRITE NEXT operation, INQUIRY 730 "LRE OPERATION IS WRITE NEXT?" If it is not a WRITE NEXT operation, then processing continues for the Locate Record Extended command, STEP 722 "NORMAL PROCESSING." If a WRITE NEXT operation is requested, then this tells the storage controller that the write logical position indicator will be used during processing. Further, the LRE parameters are saved for the channel program and a number of variables are set, STEP 732. In particular, a Writes_Done counter is set to zero and a Writes_Needed parameter is set equal to the Locate Record Extended Count parameter. Exclusive locks are obtained for the Write Pointer and the session options and pointer values and options are looked up in the global array.

Thereafter, a determination is made as to whether the channel program has authority to perform the operation as granted by the file mask and other DX parameters, INQUIRY 733 "OPERATION WITHIN AUTHORITY GRANTED BY FILE MASK?" If no authority has been granted, then an error is set, STEP 735 "ERROR." If however, authority has been granted, then exclusive locks are obtained for the tracks to be updated and processing of the LRE is complete, STEP 736 "OBTAIN EXCLUSIVE LOCKS FOR TRACKS TO BE UPDATED."

WRITE NEXT processing then continues with the Write CKD command. The Write Count-Key-Data command transfers to the storage controller the count, (optional) key, and data fields of a record to be written to, for example, the DASD volume. The record can be of any length that will fit on a track of the DASD volume to which the I/O operation is addressed. Subsequent Write CKD channel commands may write additional records on the track, and the remainder of the track is erased from the end of the last record written on the track to the end of the track. In order to implement a WRITE NEXT operation, the typical Write Count-Key-Data operation is changed such that the CCHHR bytes of the count field are zero. This is because it is the storage controller, and not the host program, that knows where the data will be written. Additionally, the WRITE NEXT operation of the present invention will allow the command to advance to the next track when the specified record will not fit on the current track, but will fit on the next track, if it is within the defined extent.

Write CKD commands are used in the above examples. However, it will be apparent to those of ordinary skill in the art that various other write commands, format and update, as well as various Read CKD commands, may be used. Use of update writes would require that the data set be preformatted with user records before use.

Figure 7B:
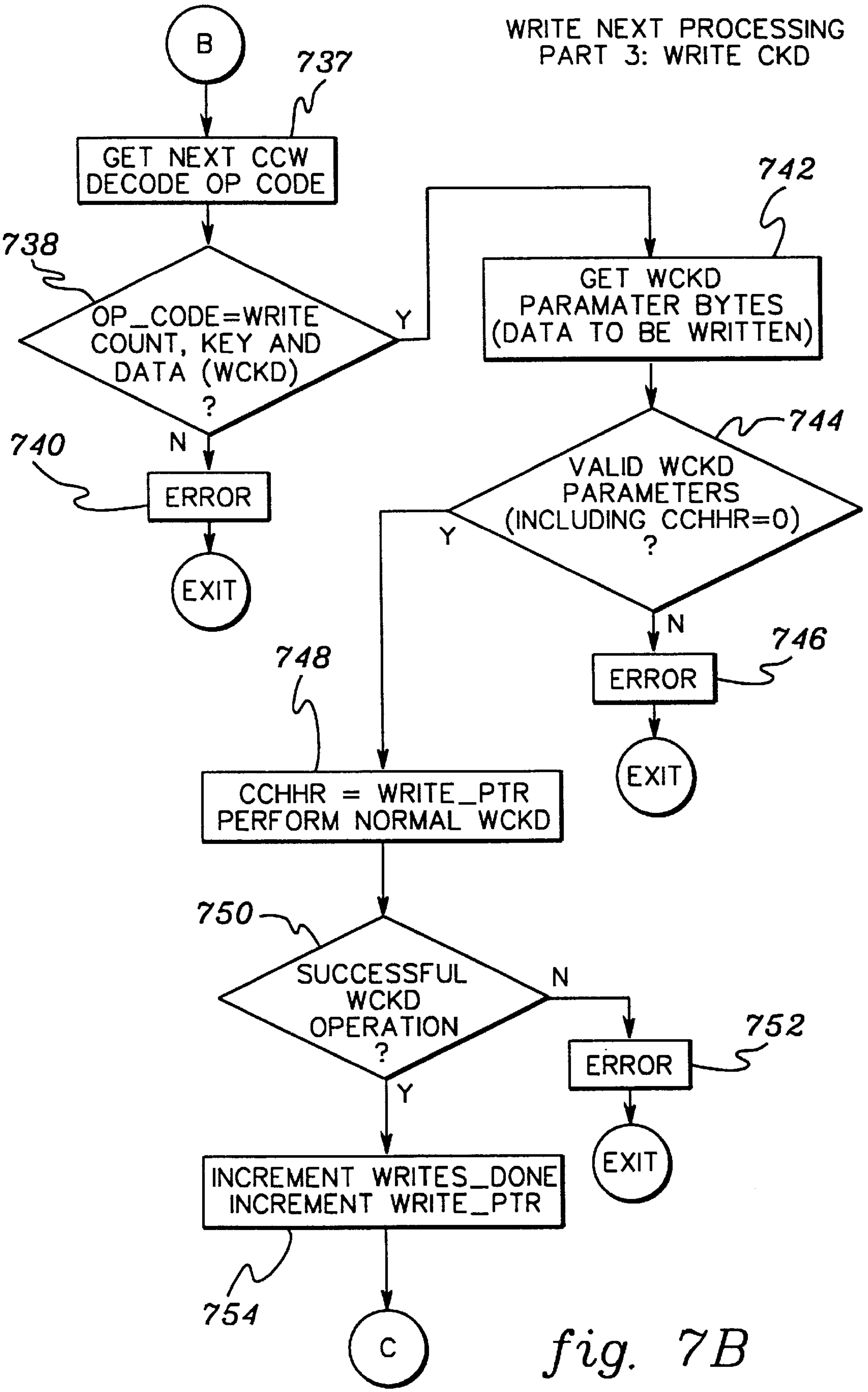
Figure 7C:
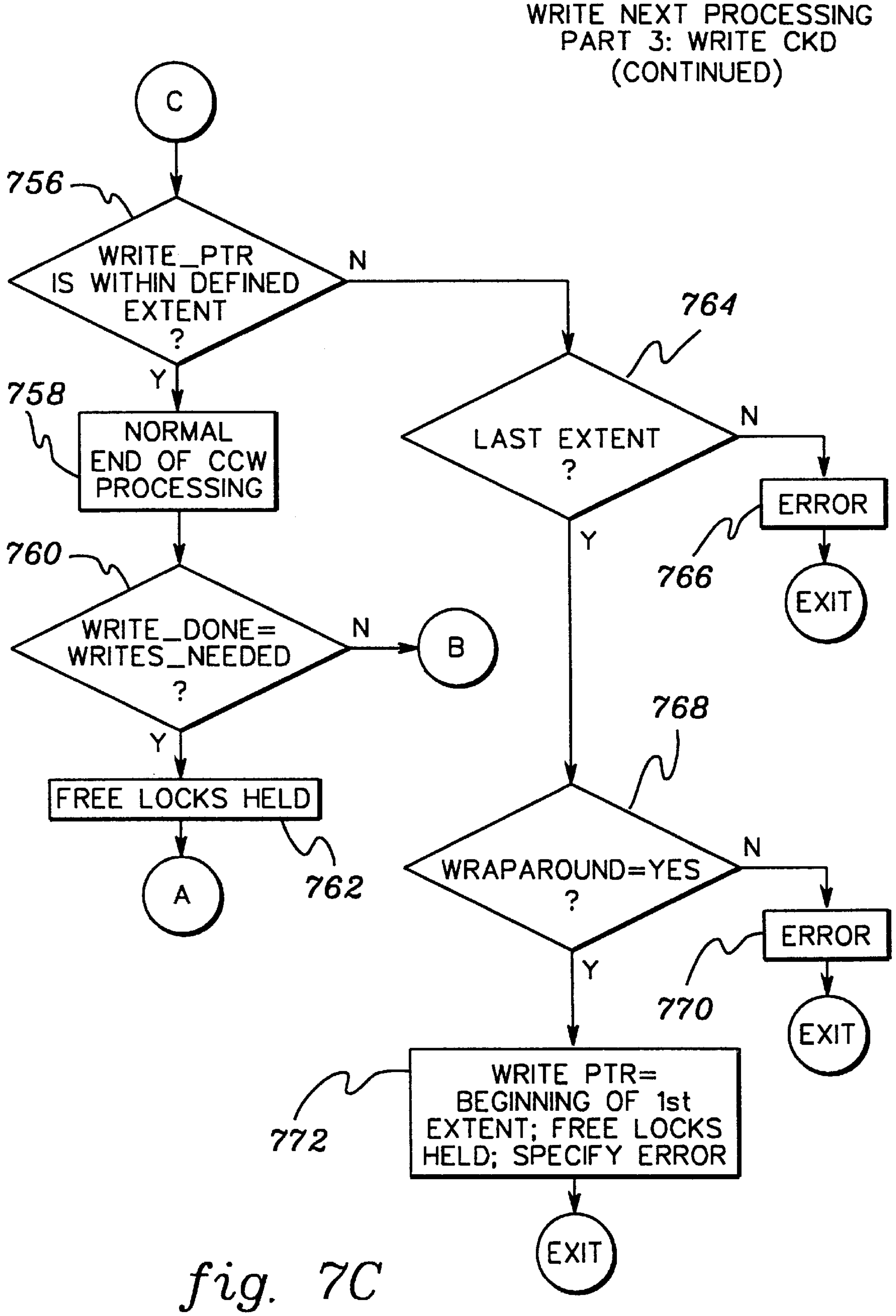

In order to process a Write CKD command, initially, the next CCW is obtained and the op code is decoded, STEP 737 "GET NEXT CCW; DECODE OP CODE" (FIG. 7B). If the decoded op code is not equal to Write Count Key and Data, INQUIRY 738, then the locks are freed and an error is flagged, STEP 740 "ERROR." If, however, a Write Count Key and Data op code is provided, then the parameter bytes are obtained, STEP 742, and validated, INQUIRY 744 "VALID WCKD PARAMETERS (INCLUDING CCHHR=0)?" If the parameter bytes are invalid, then once again the locks are freed and an error is flagged, STEP 746 "ERROR." However, if the parameter bytes are valid, then processing continues. In particular, the CCHHR is set equal to the value of the write pointer and normal processing of the Write Count Key Data command is performed, STEP 748.

Subsequently, a determination is made as to whether the operation was successful, INQUIRY 750. If it was unsuccessful, the locks are freed and an error is flagged, STEP 752 "ERROR." However, if the operation was successful, then a Writes_Done counter is incremented, as well as the logical position write pointer, STEP 754.

Next, a determination is made as to whether the incremented write pointer is within the defined extent, INQUIRY 756 (FIG. 7C). If the write pointer is within the defined extent, then CCW processing of the WCKD terminates normally, STEP 758 "NORMAL END OF CCW PROCESSING." Thereafter, a further determination is made as to whether the Writes_Done counter is equal to the Writes_Needed counter, INQUIRY 760. If not, then processing of the locate record extended domain continues with STEP 737 "GET NEXT CCW; DECODE OP CODE." If, however, the two counters are equal, then the locks that were held are freed, STEP 762 "FREE LOCKS HELD," and processing of the channel program continues with STEP 718 "GET NEXT CCW; DECODE OP CODE."

Returning to INQUIRY 756 "WRITE_PTR IS WITHIN DEFINED EXTENT?", if the write pointer is not within the defined extent, then a further inquiry is made as to whether this is the last extent, INQUIRY 764 "LAST EXTENT?". If this is not the last extent, then the write pointer is set to the beginning of the next extent, the locks are freed and an error is flagged, STEP 766. On the other hand, if it is the last extent, then an inquiry is made as to whether wraparound of the session extents (usualy a data set) is permitted, INQUIRY 768 "WRAPAROUND=YES?" If wraparound is not permitted, then the locks are freed and an error is flagged, STEP 770 "ERROR." However, if wraparound is permitted, then the write pointer is set equal to the beginning of the first extent, the locks are released and an error is flagged, STEP 772.

Described above is one example of WRITE NEXT processing, in accordance with the principles of the present invention. This is only one of many examples. The steps depicted in the flow diagrams can be performed in other orders and/or may contain fewer or more steps without departing from the spirit of the invention. Additionally, in the implementation described above, the obtaining of exclusive locks for the updating of tracks allows relatively simple recovery from I/O errors. However, in another embodiment, higher performance may be achieved by changing from the locking of the pointers and tracks to using compare and swap logic on the pointers. This allows concurrent access by multiple hosts, but makes recovery more difficult.

The Define Extent (DX) command, the Locate Record Extended (LRE) command, the Write Count-Key-Data (WCKD) command, described above, and the Read Count-Key-Data (RCKD) command, mentioned below, are described in the aforementioned "IBM 3990 Storage Control Reference for Model 6, " Publication Number GA32-0274-02, Third Edition (March 1995), offered by International Business Machines Corporation, which is hereby incorporated herein by reference in its entirety. However, the changes necessary to implement the techniques of the present invention are described in detail herein.

Depicted below are two more examples of using the logical positioning mechanism of the present invention. First is an example illustrating multiple systems writing to a single log data set. The system writing to the data set is designated in the system field. The commands are described in detail above and, therefore, the description is not repeated here. These examples illustrate processing of the PADS using half-track records to a dataset, beginning at cylinder 20, head 0.

TABLE 2

Sequence of Events

| Sequence | System | Operation | Description | Write Pointer | Read Pointer |
|---|---|---|---|---|---|
| 1 | 1 | Establish PADS Session | PSF command issued to subsystem to register the PADS session and establish the extents of the data set to be processed.<br>Define Extent<br>Beginning of First Extent<br>End of First Event<br>Flags and other parameters<br>Perform Subsystem Function<br>Operation Code: Establish PADS Session<br>Flags and other parameters<br>PADS Session ID<br>Number of Events<br>Beginning of First Extent<br>End of First Extent<br>Beginning of Second Extent<br>End of Second Extent, Etc. | 0020<br>0000<br>01 | Null |
| 2 | 1 | Write Next 5 Records | Define Extent<br>PADS Session ID<br>End of First Extent<br>Flags and other parameters<br>Locate Record Extended<br>Operation Code: Write Next<br>Count (of following Write CKD CCWs)<br>Flags and other parameters<br>Write CKD<br>Count (=0), Key (Optional), and Data Fields<br>Write CKD<br>Write CKD<br>Write CKD<br>Write CKD | 0020<br>0002<br>02 | Null |
| 3 | 1 | Write Next 3 Records | Define Extent<br>(PADS Session ID)<br>Locate Record Extended<br>(Write Next)<br>Write CKD<br>Write CKD<br>Write CKD | 0020<br>0004<br>01 | Null |
| 4 | 1 | Write Next 5 Records | Define Extent<br>(PADS Session ID)<br>Locate Record Extended<br>(Write Next)<br>Write CKD<br>Write CKD<br>Write CKD<br>Write CKD<br>Write CKD | 0020<br>0006<br>02 | Null |
| 5 | 1 | Write Next 4 Records | Define Extent<br>(PADS Session ID)<br>Locate Record Extended<br>(Write Next)<br>Write CKD<br>Write CKD<br>Write CKD<br>Write CKD | 0020<br>0008<br>02 | Null |
| 6 | 1 | Write Next 4 Records | Define Extent<br>(PADS Session ID) | 0020<br>000A | Null |

TABLE 2-continued

Sequence of Events

| Sequence | System | Operation | Description | Write Pointer | Read Pointer |
|---|---|---|---|---|---|
| | | | Locate Record Extended<br>(Write Next)<br>Write CKD<br>Write CKD<br>Write CKD<br>Write CKD | 02 | |
| 7 | 1 | Write Next 5 Records | Define Extent<br>(PADS Session ID)<br>Locate Record Extended<br>(Write Next)<br>Write CKD<br>Write CKD<br>Write CKD<br>Write CKD<br>Write CKD | 0020<br>000D<br>01 | Null |
| 8 | 2 | Establish PADS Session | PSF Command issued to subsystem to register the PADS session and establish the extents of the data set to be processed<br>Define Extent<br>Beginning of First Extent<br>End of First Extent<br>Fiags and other parameters<br>Perform Subsystem Function<br>Cperation Code: Establish PADS Session<br>Flags and other parameters<br>PADS Session ID<br>(Same as System 1)<br>Number of Extents<br>Beginning of First Extent<br>End of First Extent<br>Beginning of Second Extent:<br>End of Second Extent, Etc. | 0020<br>000D<br>01 | Null |
| 9 | 1 | Write Next 4 Records | Define Extent<br>(PADS Session ID)<br>Locate Record Extended<br>(Write Next)<br>Write CKD<br>Write CKD<br>Write CKD<br>Write CKD | 0021<br>0000<br>01 | Null |
| 10 | 2 | Write Next 5 Records | Define Extent<br>(PADS Session ID)<br>Locate Record Extended<br>(Write Next)<br>Write CKD<br>Write CKD<br>Write CKD<br>Write CKD<br>Write CKD | 0021<br>0002<br>02 | Null |
| 11 | 2 | Write Next 5 Records | Define Extent<br>(PADS Session ID)<br>Locate Record Extended<br>(Write Next)<br>Write CKD<br>Write CKD<br>Write CKD<br>Write CKD<br>Write CKD | 0021<br>0005<br>01 | Null |
| 12 | 1 | Write Next 5 Records | Define Extent<br>(PADS Session ID)<br>Locate Record Extended<br>(Write Next) | 0021<br>0007<br>02 | Null |

TABLE 2-continued

Sequence of Events

| Sequence | System | Operation | Description | Write Pointer | Read Pointer |
|---|---|---|---|---|---|
| | | | Write CKD | | |
| | | | Write CKD | | |
| | | | Write CKD | | |
| | | | Write CKD | | |
| | | | Write CKD | | |
| 13 | 2 | Write Next | Define Extent | 0021 | Null |
| | | 3 Records | (PADS Session ID) | 0009 | |
| | | | Locate Record Extended | 01 | |
| | | | (Write Next) | | |
| | | | Write CKD | | |
| | | | Write CKD | | |
| | | | Write CKD | | |
| 14 | 1 | Write Next | Define Extent | 0021 | Null |
| | | 4 Records | (PADS Session ID) | 000B | |
| | | | Locate Record Extended | 01 | |
| | | | (Write Next) | | |
| | | | Write CKD | | |
| | | | Write CKD | | |
| | | | Write CKD | | |
| | | | Write CKD | | |

The last example illustrates multiple systems accessing a single log data set. Two systems are writing to the log data set and another system is reading from the log data set. Since read operations are being performed in this example, the read pointer is being utilized and one example of the logic associated with a READ NEXT command is described after the example.

TABLE 3

Sequence of Events

| Sequence | System | Operation | Description | Write Pointer | Read Pointer |
|---|---|---|---|---|---|
| 1 | 1 | Establish | PSF command issued to | 0020 | Null |
| | | PADS | subsystem to register the | 0000 | |
| | | Session | PADS session and | 01 | |
| | | | establish the extents of the | | |
| | | | data set to he processed. | | |
| | | | Define Extent | | |
| | | | Beginning of First | | |
| | | | Extent | | |
| | | | End of First Extent | | |
| | | | Flags and other | | |
| | | | parameters | | |
| | | | Perfonn Subsystem | | |
| | | | Function | | |
| | | | Operation Code: | | |
| | | | Establish PADS | | |
| | | | Session | | |
| | | | Flags and other | | |
| | | | parameters | | |
| | | | PADS Session ID | | |
| | | | Number of Extents | | |
| | | | Beginning of First | | |
| | | | Extent | | |
| | | | End of First Extent | | |
| | | | Beginning of Second | | |
| | | | Extent | | |
| | | | End of Second Extent, | | |
| | | | Etc. | | |
| 2 | 1 | Write Next | Define Extent | 0020 | Null |
| | | 5 Records | PADS Session ID | 0002 | |
| | | | Beginning of First | 02 | |
| | | | Extent | | |
| | | | End of First Extent | | |
| | | | Flags and other | | |

TABLE 3-continued

Sequence of Events

| Sequence | System | Operation | Description | Write Pointer | Read Pointer |
|---|---|---|---|---|---|
| | | | parameters | | |
| | | | Locate Record Extended | | |
| | | | Operation Code: | | |
| | | | Write Next | | |
| | | | Count (of following | | |
| | | | Write CKD CCWs) | | |
| | | | Fiags and other | | |
| | | | parameters | | |
| | | | Write CKD | | |
| | | | Count (=0), Key | | |
| | | | (Optional), | | |
| | | | and Data Fields | | |
| | | | Write CKD | | |
| | | | Write CKD | | |
| | | | Write CKD | | |
| | | | Write CKD | | |
| 3 | 1 | Write Next | Define Extent | 0020 | Null |
| | | 3 Records | (PADS Session ID) | 0004 | |
| | | | Locate Record Extended | 01 | |
| | | | (Write Next) | | |
| | | | Write CKD | | |
| | | | Write CKD | | |
| | | | Write CKD | | |
| 4 | 1 | Write Next | Define Extent | 0020 | Null |
| | | 5 Records | (PADS Session ID) | 0006 | |
| | | | Locate Record Extended | 02 | |
| | | | (Write Next) | | |
| | | | Write CKD | | |
| | | | Write CKD | | |
| | | | Write CKD | | |
| | | | Write CKD | | |
| | | | Write CKD | | |
| 5 | 1 | Write Next | Define Extent | 0020 | Null |
| | | 4 Records | (PADS Session ID) | 0008 | |
| | | | Locate Record Extended | 02 | |
| | | | (Write Next) | | |
| | | | Write CKD | | |
| | | | Write CKD | | |
| | | | Write CKD | | |
| | | | Write CKD | | |
| 6 | 1 | Write Next | Define Extent | 0020 | Null |
| | | 4 Records | (PADS Session ID) | 000A | |
| | | | Locate Record Extended | 02 | |
| | | | (Write Next) | | |
| | | | Write CKD | | |
| | | | Write CKD | | |
| | | | Write CKD | | |
| | | | Write CKD | | |
| 7 | 1 | Write Next | Define Extent | 0020 | Null |
| | | 5 Records | (PADS Session ID) | 000D | |
| | | | Locate Record Extended | 01 | |
| | | | (Write Next) | | |
| | | | Write CKD | | |
| | | | Write CKD | | |
| | | | Write CKD | | |
| | | | Write CKD | | |
| | | | Write CKD | | |
| 8 | 2 | Establish | PSF Command issued to | 0020 | Null |
| | | PADS | subsystem to register the | 000D | |
| | | Session | PADS session and | 01 | |
| | | | establish the extents of the | | |
| | | | data set to be processed. | | |
| | | | Define Extent | | |
| | | | Beginning of First | | |
| | | | Extent | | |
| | | | End of First Extent | | |
| | | | Flags and other | | |
| | | | parameters | | |
| | | | Perform Subsystem | | |
| | | | Function | | |
| | | | Operation Code: | | |
| | | | Establish PADS | | |
| | | | Session | | |

TABLE 3-continued

Sequence of Events

| Sequence | System | Operation | Description | Write Pointer | Read Pointer |
|---|---|---|---|---|---|
| | | | Flags and other parameters | | |
| | | | PADS Session ID (Same as System 1) | | |
| | | | Number of Extents | | |
| | | | Beginning of First Extent | | |
| | | | End of First Extent | | |
| | | | Beginning of Second Extent | | |
| | | | End of Second Extent, Etc. | | |
| 9 | 1 | Write Next 4 Records | Define Extent | 0021 | Null |
| | | | (PADS Session ID) | 0000 | |
| | | | Locate Record Extended (Write Next) | 01 | |
| | | | Write CKD | | |
| | | | Write CKD | | |
| | | | Write CKD | | |
| | | | Write CKD | | |
| 10 | 2 | Write Next 5 Records | Define Extent | 0021 | Null |
| | | | (PADS Session ID) | 0002 | |
| | | | Locate Record Extended (Write Next) | 02 | |
| | | | Write CKD | | |
| | | | Write CKD | | |
| | | | Write CKD | | |
| | | | Write CKD | | |
| | | | Write CKD | | |
| 11 | 2 | Write Next 5 Records | Define Extent | 0021 | Null |
| | | | (PADS Session ID) | 0005 | |
| | | | Locate Record Extended (Write Next) | 01 | |
| | | | Write CKD | | |
| | | | Write CKD | | |
| | | | Write CKD | | |
| | | | Write CKD | | |
| | | | Write CKD | | |
| 12 | 1 | Write Next 5 Records | Define Extent | 0021 | Null |
| | | | (PADS Session ID) | 0007 | |
| | | | Locate Record Extended (Write Next) | 02 | |
| | | | Write CKD | | |
| | | | Write CKD | | |
| | | | Write CKD | | |
| | | | Write CKD | | |
| | | | Write CKD | | |
| 13 | 3 | Establish PADS Session | PSF Command issued to subsystem to register the PADS session and establish the extents of the data set to be processed. | 0021<br>0007<br>02 | 0020<br>0000<br>01 |
| | | | Define Extent | | |
| | | | Beginning of First Extent | | |
| | | | End of First Extent | | |
| | | | Flags and other parameters | | |
| | | | Perform Subsystem Function | | |
| | | | Operation Code: Establish PADS Session | | |
| | | | Flags and other parameters | | |
| | | | PADS Session ID (Same as Systems 1 and 2) | | |
| | | | Number of Extents | | |
| | | | Beginning of First Extent | | |
| | | | End of First Extent | | |
| | | | Beginning of Second | | |

TABLE 3-continued

Sequence of Events

| Sequence | System | Operation | Description | Write Pointer | Read Pointer |
|---|---|---|---|---|---|
| | | | Extent | | |
| | | | End of Second Extent, Etc. | | |
| 14 | 3 | Read Next 8 Records | Define Extent | 0021 | 0020 |
| | | | (PADS Session ID) | 0007 | 0004 |
| | | | Locate Record Extended (Read Next) | 02 | 01 |
| | | | Read CKD | | |
| | | | Read CKD | | |
| | | | Read CKD | | |
| | | | Read CKD | | |
| | | | Read CKD | | |
| | | | Read CKD | | |
| | | | Read CKD | | |
| | | | Read CKD | | |
| 15 | 3 | Read Next 8 Records | Define Extent | 0021 | 0020 |
| | | | (PADS Session ID) | 0007 | 0008 |
| | | | Locate Record Extended (Read Next) | 02 | 01 |
| | | | Read CKD | | |
| | | | Read CKD | | |
| | | | Read CKD | | |
| | | | Read CKD | | |
| | | | Read CKD | | |
| | | | Read CKD | | |
| | | | Read CKD | | |
| | | | Read CKD | | |
| 16 | 3 | Read Next 8 Records | Define Extent | 0021 | 0020 |
| | | | (PADS Session ID) | 0007 | 000C |
| | | | Locate Record Extended (Read Next) | 02 | 01 |
| | | | Read CKD | | |
| | | | Read CKD | | |
| | | | Read CKD | | |
| | | | Read CKD | | |
| | | | Read CKD | | |
| | | | Read CKD | | |
| | | | Read CKD | | |
| | | | Read CKD | | |
| 17 | 2 | Write Next 3 Records | Define Extent | 0021 | 0020 |
| | | | (PADS Session ID) | 0009 | 000C |
| | | | Locate Record Extended (Write Next) | 01 | 01 |
| | | | Write CKD | | |
| | | | Write CKD | | |
| | | | Write CKD | | |
| 18 | 3 | Read Next 8 Records | Define Extent | 0021 | 0021 |
| | | | (PADS Session ID) | 0009 | 0001 |
| | | | Locate Record Extended (Read Next) | 01 | 01 |
| | | | Read CKD | | |
| | | | Read CKD | | |
| | | | Read CKD | | |
| | | | Read CKD | | |
| | | | Read CKD | | |
| | | | Read CKD | | |
| | | | Read CKD | | |
| | | | Read CKD | | |
| 19 | 3 | Read Next 8 Records | Define Extent | 0021 | 0021 |
| | | | (PADS Session ID) | 0009 | 0005 |
| | | | Locate Record Extended (Read Next) | 01 | 01 |
| | | | Read CKD | | |
| | | | Read CKD | | |
| | | | Read CKD | | |
| | | | Read CKD | | |
| | | | Read CKD | | |
| | | | Read CKD | | |
| | | | Read CKD | | |
| | | | Read CKD | | |
| 20 | 3 | Read Next 8 Records | Define Extent | 0021 | 0021 |
| | | | (PADS Session ID) | 0009 | 0009 |
| | | | Locate Record Extended | 01 | 01 |

TABLE 3-continued

Sequence of Events

| Sequence | System | Operation | Description | Write Pointer | Read Pointer |
|---|---|---|---|---|---|
| | | | (Read Next) | | |
| | | | Read CKD | | |
| | | | Read CKD | | |
| | | | Read CKD | | |
| | | | Read CKD | | |
| | | | Read CKD | | |
| | | | Read CKD | | |
| | | | Read CKD | | |
| | | | Read CKD | | |
| 21 | 1 | Write Next 4 Records | Define Extent | 0021 | 0021 |
| | | | (PADS Session ID) | 000B | 0009 |
| | | | Locate Record Extended | 01 | 01 |
| | | | (Write Next) | | |
| | | | Write CKD | | |
| | | | Write CKD | | |
| | | | Write CKD | | |
| | | | Write CKD | | |
| 22 | 3 | Read Next 8 Records | Define Extent | 0021 | 0021 |
| | | | (PADS Session ID) | 000B | 000B |
| | | | Locate Record Extended | 01 | 01 |
| | | | (Read Next) | | |
| | | | Read CKD | | |
| | | | Read CKD | | |
| | | | Read CKD | | |
| | | | Read CKD | | |
| | | | Read CKD<---- Unit Check No Record Found | | |
| | | | Read CKD<---- Not Executed | | |
| | | | Read CKD<---- Not Executed | | |
| | | | Read CKD<---- Not Executed | | |

Figure 8:
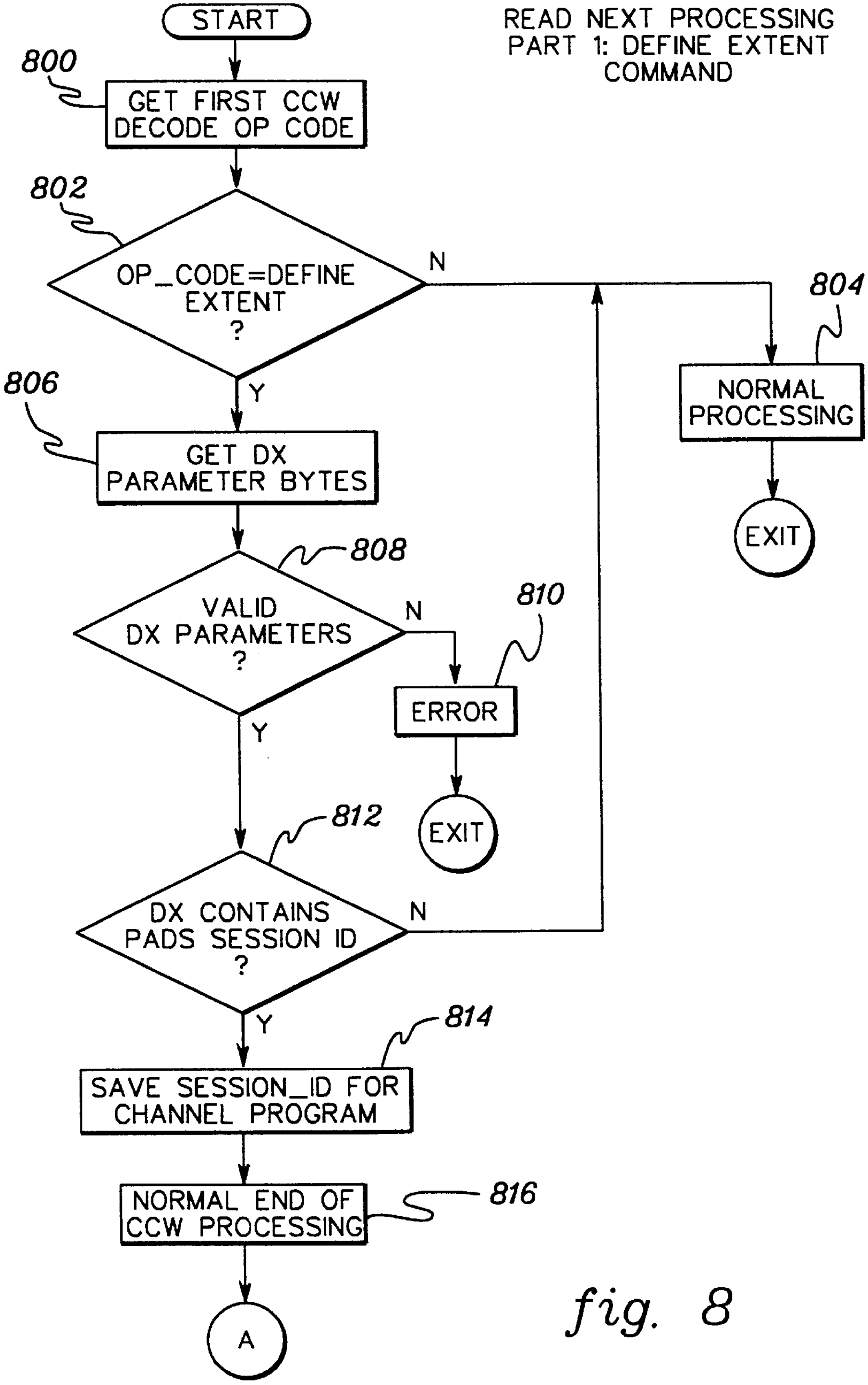
FIGS. 8–8C depict one example of the logic used to read data from a storage device using the logical pointers of the present invention.
Figure 8A:
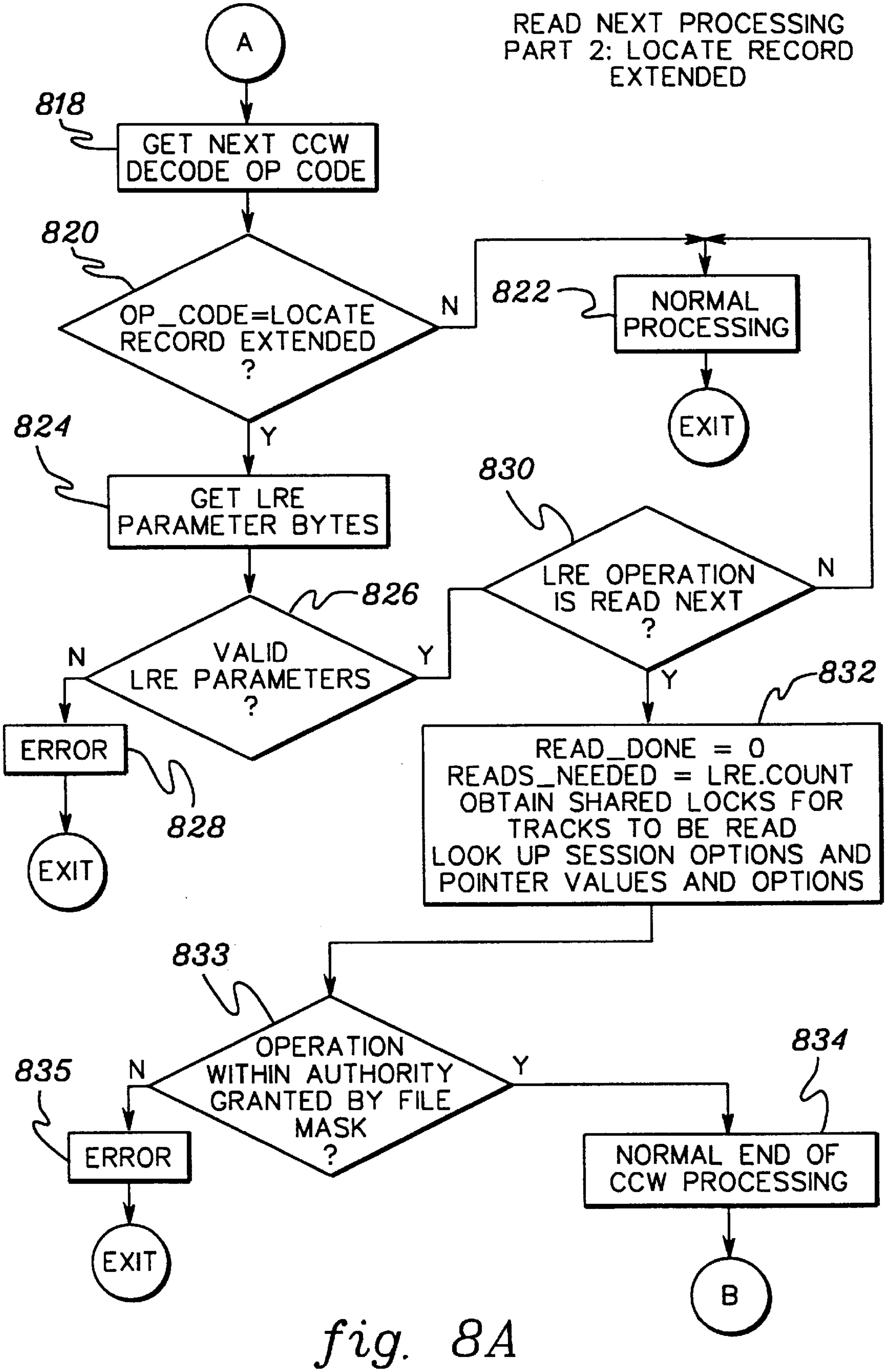
Figure 8B:
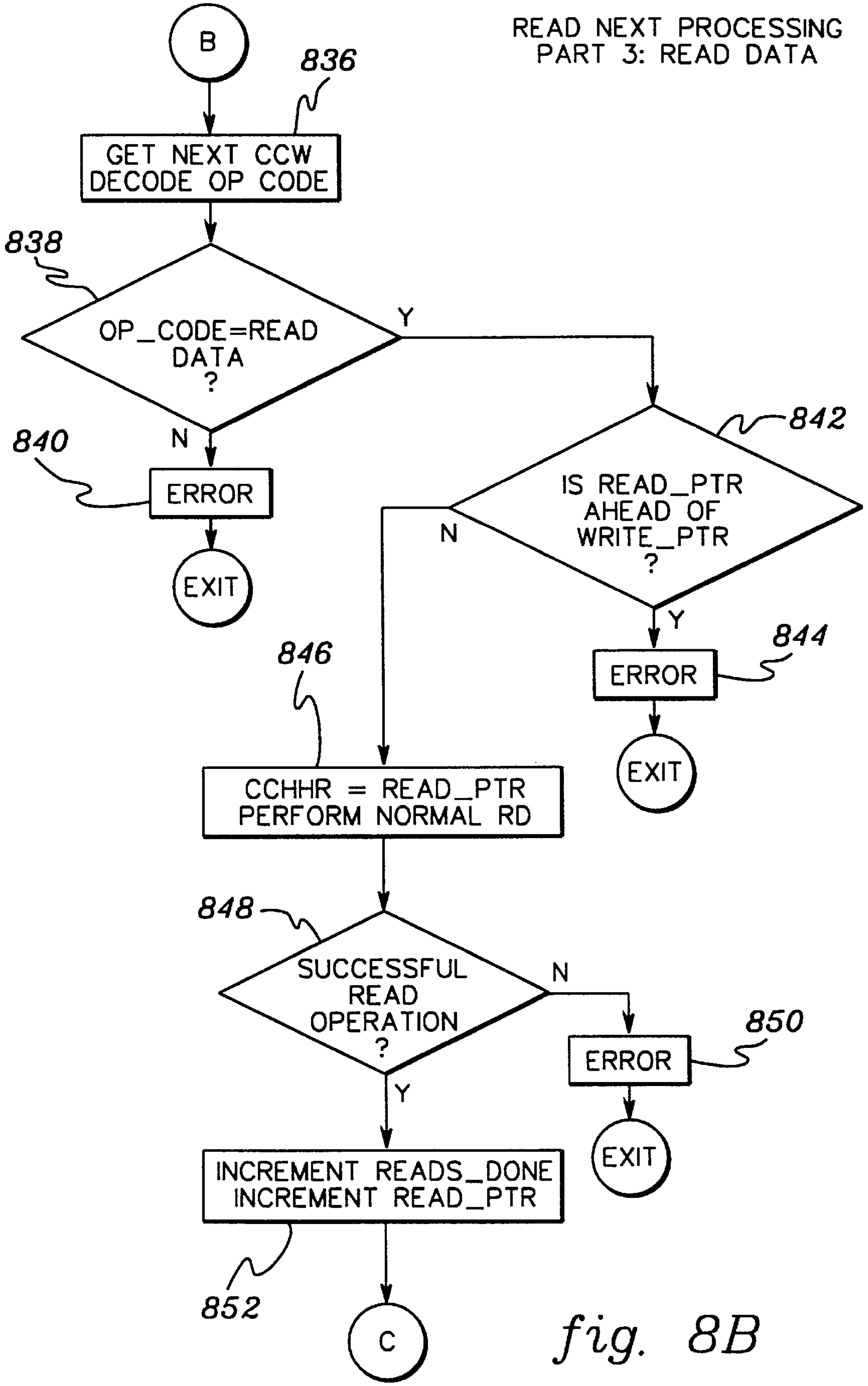
Figure 8C:
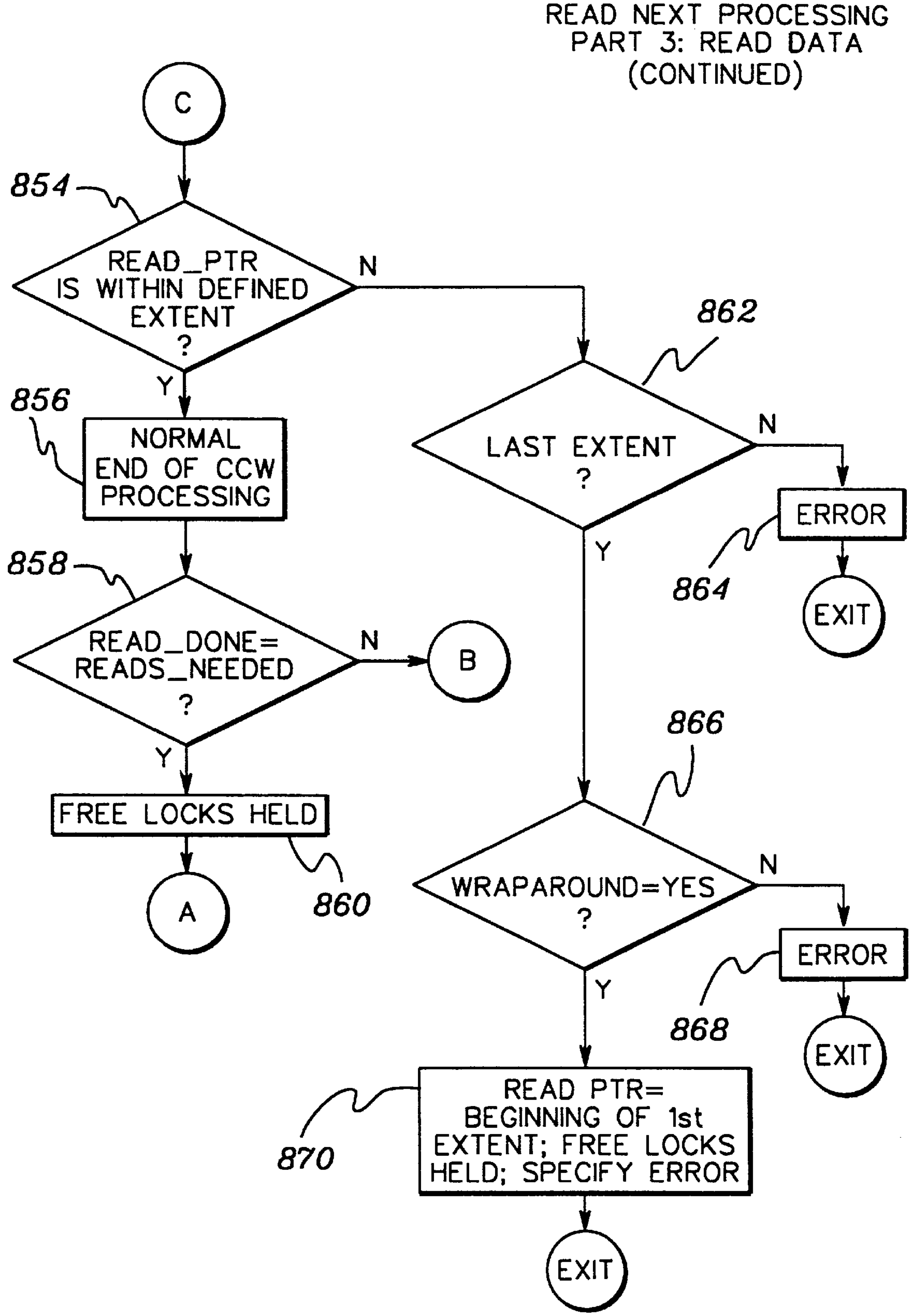

In the above described example, READ NEXT processing is used. One example of READ NEXT processing is depicted in FIGS. 8–8C and described in detail below.

Initially, as with WRITE NEXT processing, a session is defined and then READ NEXT processing may proceed. Specifically, referring to FIG. 8, initially a Define Extent command is processed. A CCW is received from the host processor, e.g. processor 3 in the above example, and the op code is decoded by the storage controller, STEP 800 "GET FIRST CCW, DECODE OP CODE." If the decoded op code does not represent a Define Extent (DX) command, INQUIRY 802, then processing proceeds in a standard fashion, STEP 804 "NORMAL PROCESSING." However, if the operation to be performed is a Define Extent operation, then the Define Extent parameter bytes are obtained, STEP 806 "GET DX PARAMETER BYTES." Next, a determination is made as to whether the parameters are valid, INQUIRY 808. If the parameters are invalid, then an error is flagged, STEP 810 "ERROR." However, if the parameters are valid, then a further determination is made as to whether the Define Extent command contains a PADS session ID, INQUIRY 812 "DX CONTAINS PADS SESSION ID?" If the Define Extent command does not contain a PADS session ID, then normal processing of the Define Extent command continues, STEP 804 "NORMAL PROCESSING." However, if a PADS session ID is contained within the Define Extent operation, then the session ID and other DX parameters are saved for use by the channel program, STEP 814 "SAVE SESSION_ID FOR CHANNEL PROGRAM." Thereafter, channel command word processing is terminated for the Define Extent command, STEP 816 "NORMAL END OF CCW PROCESSING."

After the Define Extent command is processed, READ NEXT processing continues by executing a Locate Record Extended (LRE) command. In particular, referring to FIG. 8A, the next CCW is obtained and the op code is decoded, STEP 818 "GET NEXT CCW; DECODE OP CODE." A determination is made as to whether the op code represents the Locate Record Extended command, INQUIRY 820. If it does not, then processing continues as if a Locate Record Extended command was not issued, STEP 822 "NORMAL PROCESSING." However, if a Locate Record Extended command is issued, then the parameter bytes for that command are obtained, STEP 824 "GET LRE PARAMETER BYTES," and a determination is made as to whether the parameters are valid, INQUIRY 826 "VALID LRE PARAMETERS?" If the parameters are invalid, then an error is flagged, STEP 828 "ERROR." However, if the parameters are valid, then a further determination is made as to whether the operation to be performed is a READ NEXT operation, INQUIRY 830 "LRE OPERATION IS READ NEXT?" If it is not a READ NEXT operation, then processing continues of the Locate Record Extended command, STEP 822 "NORMAL PROCESSING." If a READ NEXT operation is requested, then this tells the storage controller that the read logical position indicator will be used during processing. Further, the LRE parameters are saved for the channel program and a number of variables are set, STEP 832. In particular, a Reads Done counter is set to zero and a Reads_Needed parameter is set equal to the Locate Record Extended Count parameter. Exclusive locks are obtained for the read pointer and the session options and pointer values and options are looked up in global array 400.

Thereafter, a determination is made as to whether the host has authority to perform the operation, as granted by the file mask and other DX parameters, INQUIRY 833 "OPERATION WITHIN AUTHORITY GRANTED BY FILE MASK?" If insufficient authority has been granted, then an error is flagged, STEP 835 "ERROR." If however, authority has been granted, then exclusive locks are obtained for the tracks to be updated and processing of the LRE is complete, STEP 834 "NORMAL END OF PROCESSING."

READ NEXT processing then continues with the Read CKD command. As before, the next CCW is obtained and the op code is decoded, STEP 836 "GET NEXT CCW; DECODE OP CODE." If the decoded op code is not equal to read data, then the locks are freed and an error is flagged, STEP 840 "ERROR." If, however, a read data op code is provided, then a determination is made as to whether the read pointer is ahead of the write pointer, INQUIRY 842. If the read pointer is ahead of the write pointer, then the locks are freed and an error is flagged, STEP 844 "ERROR." However, if the read pointer is not ahead of the write pointer, then processing continues. In particular, the CCHHR is set equal to the value of the read pointer and normal processing of the Read Count Key Data command is performed, STEP 846.

Subsequently, a determination is made as to whether the operation was successful, INQUIRY 848. If it was unsuccessful, the locks are freed and an error is flagged, STEP 850 "ERROR." However, if the read operation was successful, then a Reads_Done counter is incremented, as well as the logical position read_pointer, STEP 852.

Next, a determination is made as to whether the read pointer is within the defined extent, INQUIRY 854 (FIG. 8C). If the read pointer is within the defined extent, then CCW processing of the RCKD terminates normally, STEP 856 "NORMAL END OF CCW PROCESSING." Thereafter, a further determination is made as to whether the Reads_Done counter is equal to the Reads_Needed counter, INQUIRY 858. If not, then processing continues with STEP 836 "GET NEXT CCW; DECODE OP CODE." If, however, the two counters are equal, then the locks that were held are freed, STEP 860 "FREE LOCKS HELD," and processing continues with STEP 818 "GET NEXT CCW; DECODE OP CODE."

Returning to INQUIRY 854 "READ_PTR IS WITHIN DEFINED EXTENT?", if the read_pointer is not within the defined extent, then a further inquiry is made as to whether this is the last extent, INQUIRY 862 "LAST EXTENT?" If this is not the last extent, then the read pointer is set to the beginning of the next extent, the locks are freed and an error is flagged, STEP 864. On the other hand, if it is the last extent, then an inquiry is made as to whether wraparound of the extent is permitted, INQUIRY 866 "WRAPAROUND=YES?" If wraparound is not permitted, then the locks are freed and an error is flagged, STEP 868 "ERROR." However, if wraparound is permitted, then the write pointer is set equal to the beginning of the first extent, the locks are released and an error is flagged, STEP 870.

Described above is one example of READ NEXT processing, in accordance with the principles of the present invention. This is only one of the many examples. The steps depicted in the flow diagrams can be performed in other orders and/or may contain fewer or more steps without departing from the spirit of the invention.

The above described examples depict various scenarios in which the logical position indicators of the present invention are used. The above examples are particularly pertinent to logging data to a single log data set. A couple of the examples describe how multiple hosts can write data to one log data set. Specifically, multiple hosts using WRITE NEXT commands can concurrently write to the same log data set without colliding on the same records. Channel program access is atomic, and each WRITE NEXT command, whether from the same or a different sharing host, writes to a unique (i.e., the next) record.

Example 3 above further depicts the situation in which the storage controller prevents the reading ahead of data written. This is possible since it is the storage controller that controls the logical positioning and the storage controller is aware of the last logical position written to.

The above examples also illustrate that the logical position indicators are maintained across command boundaries and channel program boundaries. That is, the logical position indicators are persistent, providing greater flexibility to the computer system.

The logical positioning mechanism of the present invention provides additional features. For example, the logical positioning mechanism enables the storage device to emulate complex data structures, such as queues, stacks and/or linked lists.

As one example, the WRITE NEXT and READ NEXT, or WRITE PREVIOUS and READ PREVIOUS commands can be used to add records representing work requests to a queue and to pick the requests off the queue in first in-first out (FIFO) order. Based on the setting of the control data in the global array, the storage controller can notify the interested host systems, in one example, the host systems in the host list with a non-zero use count (via, for example, an attention interrupt) whenever a WRITE NEXT or WRITE PREVIOUS command is processed, or whenever the work queue becomes empty (write and read pointers are set equal) or non-empty (write pointer moves ahead of read pointer). The hosts could then issue an I/O command, such as to read sense data if attention plus unit check is presented by the control unit, to determine from the storage controller memory the type of change that occurred: new work on the queue, work queue empty, or work queue non-empty.

As another example, a WRITE NEXT AND ADD command and READ PREVIOUS AND DELETE command can be used to implement a stack. The WRITE NEXT AND ADD command acts as a push operation, while the READ PREVIOUS AND DELETE command acts as a pop operation. Similar to the notify used with the queues, notification can be done for stack non-empty and new item on stack.

Additionally, the READ NEXT and READ PREVIOUS commands can be used for sequential forward or backward reading of the log data set. The SET POINTER command can be used to initialize a read pointer value at appropriate times to mark the starting place for recovery processing. If the extent is set up in circular mode by, for instance, a new option flag in the PSF command used to establish the session, the pointers automatically wraparound to the start of the extent, providing a never ending log capability.

In addition to the above, the present invention addresses the handling of I/O errors associated with the use of the logical positioning mechanism. In particular, it is assumed that I/O retries done internally to the storage controller, or through dialog with the channel, do not affect the validity of the pointer values. During storage controller retries, the storage controller ensures that the pointers are only updated once per command. This is facilitated by the fact that the CCHHR of the pointer being accessed is obtained at the start of the read or write operation, and the pointer value is not incremented until the operation has completed successfully. If the storage controller retry of the operation is successful, the pointer is then incremented.

If the operation is unsuccessful after storage controller retries have been attempted, then host software retry may be performed. The sense data retrieved by the host indicates how many records in the Locate Record domain were successfully read or written. The host builds a retry channel program using,the same PADS LRE parameters as in the original channel program, except for the count, to read or write the remaining records in the Locate Record domain. Because the pointer is not incremented until the current record is successfully the nor written, the next PADS channel program for the session using that pointer will access the record on which the error occurred. The next channel program might be the retry channel program, or a normal PADS channel program. In either case, once the record has been successfully read or written, the pointer will be incremented. This implies that the records accessed by the retry channel program might not be contiguous with the records in the original channel program, even though they were all part of the same Locate Record domain in the original channel program. This is consistent with the philosophy of the invention in which the control unit is responsible for determining the logical positions to be accessed.

Other implementations could provide more complex recovery, which could ensure that all records in a Locate Record domain are accessed from contiguous positions.

Further, a selective or system reset will not affect the pointer values. If an I/O command using the logical position indicators is in progress and a selective reset is done for the volume, or a system reset is done on the active path, the I/O error will be handled as normal for the condition. The session information, including the pointer values, will be unaffected. Specifically, the pointer in use by the operation in progress will not be incremented, since the operation has not yet completed successfully. Once the normal recovery for the condition has been performed, the session data, including the pointer values, are ready for use by subsequent normal or retry PADS channel programs.

In this implementation, for the case of a system reset of all paths from a given host, the host use count is set to zero and the host id becomes invalid, in accordance with the well-known handling of the path group id in S/390. The rest of the session data, including the host ids and use counts for the other hosts, is unaffected. The host which suffered the system reset of all paths to the control unit, can subsequently issue a PSF establish command (with the OLD or EITHER option) with the same session id to regain access to the session. If system resets are received for all paths to all hosts using the session, then all host ids become invalid and all use counts are set to zero. In this case, the session is deleted.

Alternatively, in the case of system resets of all paths to all hosts using a session, another implementation could maintain the session data, including the pointer values. All host ids would be invalid and all use counts set to zero. The hosts would be allowed to subsequently regain access to the session, using a new option on the PSF establish command.

In another example, the host programs then recover the state of the sessions and re-establish them for use with the pointers. The storage controller can aid in this recovery by writing into the key field of each record a code for each pointer (e.g., the pointer id). That is, in each record, the key field section for a pointer is zero, except for the record currently addressed by the pointer; in that record the key field section has a non-zero code. The host can then determine the value of each pointer by reading all the records in the set of extents for the session and examining their key fields.

The usage and accuracy of the logical position indicator values is key to data integrity. First, on every new command the storage controller ensures that the appropriate rules are obeyed. For instance, the pointer values cannot go outside the bounds of the extents for which they are defined. If this is detected, the storage controller recognizes an extent violation. Also, the storage controller can ensure that the read pointer never "gets ahead" of its write pointer, for example. Second, if a host tries to initialize a session for use with pointers, and the session is already initialized, the storage controller can reject the command. That is, once a session is initialized, it must be deleted from the controller memory (e.g., from the global array in the controller memory) by a host I/O command before it is initialized again. Third, host programs are responsible for coordinating use of SET POINTER commands. Fourth, the storage controller serializes accesses to the global array when processing commands that use pointers. Fifth, if the global array is damaged, the storage controller rejects any I/O commands using the logical indicators with an appropriate error indication.

Described above in detail is a logical positioning mechanism, which is implemented in a system designed following the ESA/390 architecture and using the ECKD command set. As stated above, this is only one example. It will be apparent to one of ordinary skill in the art that the logical positioning mechanism of the present invention is not limited to the ESA/390 architecture or the ECKD command set and that ESA/390 and the ECKD command set are only examples. The logical positioning mechanism of the present invention can also be implemented as extensions to other industry-standard or proprietary interface command sets, such as SCSI-2 or IPI-3.

The logical positioning mechanism of the present invention advantageously empowers the storage controller with the task of determining which logical position (e.g., block or record) on the storage device is to be written to or read from. Thus, the host processors are relieved of this task. This allows, for instance, the capability of multiple host processors to write to a single log, the ability of the positioning information to be kept across channel program boundaries and the capability of the storage devices to emulate complex data structures, such as, for example, queues, stacks and linked lists.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. At least one computer readable medium for storing data usable by a storage controller coupled to a storage device of a computer system, said storage controller configured to receive commands, from one or more host processors of said computer system, for accessing said storage device, said at least one computer readable medium comprising:

a data structure stored within said at least one computer readable medium, said data structure comprising:

a logical position indicator usable by said storage controller in determining a logical position within said storage device to be accessed, a value of said logical position indicator adjustable by said storage controller, without explicit control by said one or more host processors, to coordinate access to said storage device, wherein said access is based on a plurality of said commands; and a session identifier corresponding to said logical position indicator and indicating a session of said computer system.

2. The at least one computer readable medium of claim 1, wherein said plurality of said commands comprise a first command receivable by said storage controller from a first host processor of said one or more host processors and a second command receivable by said storage controller from a second host processor of said one or more host processors.

3. The at least one computer readable medium of claim 1, wherein said plurality of said commands comprise non-consecutive commands.

4. The at least one computer readable medium of claim 1, wherein said plurality of said commands correspond to said session.

5. The at least one computer readable medium of claim 1, wherein said session identifier corresponds to said plurality of said commands.

6. The at least one computer readable medium of claim 1, wherein said plurality of said commands comprise related commands.

7. The at least one computer readable medium of claim 1, wherein said data structure further comprises a second logical position indicator usable by said storage device in determining a second logical position within said storage device to be accessed.

8. The at least one computer readable medium of claim 1, wherein said session comprises a session establishable by a host processor of said one or more host processors.

9. The at least one computer readable medium of claim 1, wherein the coordinated access comprises a first access to said storage device and a second access to said storage device, wherein said first access is based on a first command of said plurality of said commands, and wherein said second access is based on a second command of said plurality of said commands.

10. At least one computer readable medium for storing data usable by a storage controller coupled to a storage device of a computer system, said at least one computer readable medium comprising:

a data structure stored within said at least one computer readable medium, said data structure comprising:

a logical position indicator usable by said storage controller in determining a logical position within said storage device to be accessed;

a session identifier corresponding to said logical position indicator and indicating a session of said computer system; and an extent list corresponding to said session identifier, said extent list comprising a count of a number of extents within said extent list and a starting and an ending of each extent of said extent list.

11. At least one computer readable medium for storing data usable by a storage controller coupled to a storage device of a computer system, said at least one computer readable medium comprising:

a data structure stored within said at least one computer readable medium, said data structure comprising:

a logical position indicator usable by said storage controller in determining a logical position within said storage device to be accessed; and a session identifier corresponding to said logical position indicator and indicating a session of said computer system;

wherein said logical position indicator comprises a read pointer designating a next position within said storage device to be read from, and wherein said data structure further comprises at least one read pointer option corresponding to said read pointer.

12. The at least one computer readable medium of claim 11, wherein said at least one read pointer option comprises a wraparound mode.

13. At least one computer readable medium for storing data usable by a storage controller coupled to a storage device of a computer system, said at least one computer readable medium comprising:

a data structure stored within said at least one computer readable medium, said data structure comprising:

a logical position indicator usable by said storage controller in determining a logical position within said storage device to be accessed; and a session identifier corresponding to said logical position indicator and indicating a session of said computer system;

wherein said logical position indicator comprises a write pointer designating a next position within said storage device to be written to, and wherein said data structure further comprises at least one write pointer option corresponding to said write pointer.

14. The at least one computer readable medium of claim 13, wherein said at least one write pointer option comprises a wraparound mode.

15. At least one computer readable medium for storing data usable by a storage controller coupled to a storage device of a computer system, said storage controller configured to receive commands, from one or more host processors of said computer system, for accessing said storage device, said at least one computer readable medium comprising:

a data structure stored within said at least one computer readable medium, said data structure comprising:

a logical position indicator usable by said storage controller in determining a logical position within said storage device to be accessed, a value of said logical position indicator adjustable by said storage controller, without explicit control by said one or more host processors, to coordinate access to said storage device, wherein said access is based on a plurality of said commands; and a session identifier corresponding to said logical position indicator and indicating a session of said computer system;

wherein said logical position indicator comprises at least one of a read pointer and a write pointer.

16. At least one computer readable medium for storing data usable by a storage controller coupled to a storage device of a computer system, said storage controller configured to receive commands, from one or more host processors of said computer system, for accessing said storage device, said at least one computer readable medium comprising:

a data structure stored within said at least one computer readable medium, said data structure comprising:

a plurality of logical position indicators usable by said storage controller in determining one or more logical positions within said storage device to be accessed, one or more values of said logical position indicators adjustable by said storage controller, without explicit control by said one or more host processors, to coordinate access to said storage device, wherein said access is based on a plurality of said commands; and a session identifier corresponding to at least one of said plurality of logical position indicators and indicating a session of said computer system.

17. At least one computer readable medium for storing data usable by a storage controller coupled to a storage device of a computer system, said at least one computer readable medium comprising:

a data structure stored within said at least one computer readable medium, said data structure comprising:

a logical position indicator usable by said storage controller in determining a logical position within said storage device to be accessed;

a session identifier corresponding to said logical position indicator and indicating a session of said computer system; and a list of extents corresponding to said session identifier and a list of processor identifiers associated with said session identifier.

18. The at least one computer readable medium of claim 17, wherein said list of extents comprises a count of a number of extents within said list of extents and a starting and an ending location for each extent of said list of extents.

19. The at least one computer readable medium of claim 17, wherein said list of processor identifiers comprises a count of a number of processors within said list of processor identifiers, one or more processor identifiers, and a corresponding use count for each of said one or more processor identifiers.

20. At least one program storage device readable by a machine, tangibly embodying at least one program of instructions executable by the machine to perform a method for controlling logical positioning within a storage unit of a computer system, said computer system comprising a plurality of processors coupled to a storage controller, said storage controller coupled to said storage unit, said method comprising:

defining at said storage controller a logical position indicator for use by said storage controller in determining which one or more of a plurality of locations within said storage unit is to be accessed by one or more processors of said plurality of processors;

maintaining, by said storage controller, said logical position indicator to control logical positioning within said storage unit;

interfacing said storage controller with said plurality of processors to allow any one processor of said plurality of processors to issue one or more commands in order to dynamically and explicitly select any one data structure of a plurality of data structures as a format for accessing, by said any one processor, one or more locations of said locations;

emulating, by said storage controller, said any one data structure according to said one or more commands as said format for accessing, by said any one processor, said one or more locations; and accessing, by said any one processor and as allowed by said storage controller, said one or more locations according to said format.

21. The at least one program storage device of claim 20, wherein said logical position indicator is stored within a global array, wherein said global array comprises a session identifier corresponding to said logical position indicator, a list of extents corresponding to said session identifier, and a list of processor identifiers associated with said session identifier.

22. The at least one program storage device of claim 21, wherein said list of processor identifiers comprises a count of a number of processors within said list of processor identifiers, one or more processor identifiers, and a corresponding use count for each of said one or more processor identifiers.

23. The at least one program storage device of claim 20, wherein said accessing comprises at least one of reading from said one or more locations by said one or more of said plurality of processors and writing to said one or more locations by said one or more of said plurality of processors.

24. The at least one program storage device of claim 20, wherein said plurality of data structures comprise at least two of the following:

(a) a queue;

(b) a stack;

(c) a linked list; and (d) a circular buffer.

25. The at least one program storage device of claim 20, wherein said method further comprises providing, by said storage controller, access to said one or more locations by first and second processors of said plurality of processors, wherein said access by said first processor is as a first data structure of said plurality of data structures, wherein said access by said second processor is as a second data structure of said plurality of data structures, wherein said first data structure is different from said second data structure.

26. An article of manufacture, comprising:

at least one computer usable medium having computer readable program code means embodied therein for causing a control of logical positioning within a storage device of a computer system, said computer system comprising a plurality of processors coupled to a storage controller, said storage controller coupled to said storage device and configured to receive commands, from one or more host processors of said computer system, for accessing said storage device, the computer readable program code means in said article of manufacture comprising:

computer readable program code means for causing a computer to define at said storage controller a logical position indicator for use by said storage controller in determining which one or more of a plurality of locations within said storage device is to be accessed by one or more processors of said plurality of processors, a value of said logical position indicator adjustable by said storage controller, without explicit control by said one or more host processors, to coordinate access to said storage device, wherein said access is based on a plurality of said commands;

computer readable program code means for causing a computer to define at said storage controller a session identifier corresponding to said logical position indicator and indicating a session of said computer system; and computer readable program code means for causing a computer to maintain, by said storage controller, said logical position indicator to control logical positioning within said storage device.

27. The article of manufacture of claim 26, further comprising computer readable program code means for causing a computer to provide, by said storage controller, access to said one or more of said plurality of locations by first and second processors of said plurality of processors, wherein said access by said first processor is as a first data structure of a plurality of data structures, wherein said access by said second processor is as a second data structure of said plurality of data structures, wherein said first data structure is different from said second data structure.

28. The article of manufacture of claim 26, further comprising computer readable program code means for causing a computer to select any one data structure of a plurality of data structures as a format for accessing said one or more of said plurality of locations.

29. The article of manufacture of claim 28, wherein said plurality of data structures comprise at least two of the following:

(a) a queue;

(b) a stack;

(c) a linked list; and (d) a circular buffer.

* * * * *